(12) United States Patent
Lee et al.

(10) Patent No.: US 9,521,139 B2
(45) Date of Patent: Dec. 13, 2016

(54) SYSTEM FOR MANAGING MULTI-USER SIGN-ON IN A SEGMENTED NETWORK

(71) Applicant: BANK OF AMERICA CORPORATION, Charlotte, NC (US)

(72) Inventors: Jisoo Lee, Chesterfield, NJ (US); Brian Joseph Smith, St. Augustine, FL (US); Yair Frankel, Westfield, NJ (US); James P. Scopis, Newark, DE (US); Eins K. Joseph, Mickleton, NJ (US); Todd Michael Goodyear, New Hope, PA (US); Francis George Farro, II, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 112 days.

(21) Appl. No.: 14/634,472

(22) Filed: Feb. 27, 2015

(65) Prior Publication Data

US 2016/0255077 A1   Sep. 1, 2016

(51) Int. Cl.
  *H04L 29/06* (2006.01)
(52) U.S. Cl.
  CPC ....... *H04L 63/0823* (2013.01); *H04L 63/0272* (2013.01); *H04L 63/0815* (2013.01); *H04L 63/0853* (2013.01)
(58) Field of Classification Search
  CPC .................................. H04L 63/0623
  USPC ........................................ 713/159
  See application file for complete search history.

(56) References Cited

U.S. PATENT DOCUMENTS

| | | |
|---|---|---|
| 2002/0169977 A1 | 11/2002 | Chmaytelli |
| 2005/0065932 A1 | 3/2005 | Rocha |
| 2005/0240995 A1 | 10/2005 | Ali et al. |
| 2008/0189774 A1* | 8/2008 | Ansari ............... G06Q 30/04 726/7 |

* cited by examiner

*Primary Examiner* — Jacob Lipman
(74) *Attorney, Agent, or Firm* — Michael A. Springs; Moore & Van Allen PLLC; Peter B. Stewart

(57) ABSTRACT

Disclosed is a system for providing multi-user management for personal computing devices over an entity network. The system is typically configured to (i) receive a first request from the personal computing device to receive first user-specific information, (ii) authenticate the user identifier associated with the first user, (iii) associate the user identifier associated with the first user with the device identifier, (iv) communicate a first response to the personal computing device based on authenticating the user identifier, (v) receiving a second request from the personal computing device to receive second user-specific information associated with the first user for a second application, (vi) determining that the device identifier is associated with the user identifier associated with the first user, (vii) and communicating a second response to the personal computing device based on determining that the device identifier is associated with the user identifier associated with the first user.

18 Claims, 7 Drawing Sheets

SYSTEM FOR MANAGING MULTI-USER SIGN-ON IN A SEGMENTED NETWORK

FIELD OF THE INVENTION

The present invention embraces a system for providing multi-user management for personal computing devices over an entity network. The system is typically configured to (i) receive a first request from the personal computing device to receive first user-specific information, (ii) authenticate the user identifier associated with the first user, (iii) associate the user identifier associated with the first user with the device identifier, (iv) communicate a first response to the personal computing device based on authenticating the user identifier, (v) receiving a second request from the personal computing device to receive second user-specific information associated with the first user for a second application, (vi) determining that the device identifier is associated with the user identifier associated with the first user, (vii) and communicating a second response to the personal computing device based on determining that the device identifier is associated with the user identifier associated with the first user.

BACKGROUND

Various methods exist to help businesses provide management of personal computing devices on a network. A need exists for an improved system for providing multi-user management for personal computing devices on a segmented network.

SUMMARY

In one aspect, a personal device container system is presented. The personal device container system typically includes a processor, a memory, and executable code stored in the memory which is executable by the processor. In some embodiments, the personal device container system receives a first request, form a personal computing device, to connect to a provisioning network segment to provision the personal computing device to communicate with a secured network segment. The provisioning network segment and the secured network segment are part of a common network. In some embodiments of the invention, the first request comprises a first set of security credentials to authenticate the personal computing device.

In some embodiments of the invention, the personal device container system is configured to authenticate the personal computing device to communicate with the provisioning network segment based on the first set of security credentials. After authenticating the first set of security credentials, the personal device container system may be configured to create a first network tunnel between the personal computing device and the provisioning network segment. The provisioning network segment comprises a provisioning device capable of communicating a certificate to the personal computing device via the first network tunnel to provision the network device.

In some embodiments, the personal device container system receives provisioning filter rules for filtering messages communicated via the first network tunnel. Further, the personal device container system may be configured to determine that the personal computing device has communicated a provisioning request to the provisioning device via the first network tunnel. Using the filter rules, the personal device container system determines whether to filter the provisioning request or deliver the provisioning request to the provisioning system.

In some embodiments, the personal device container system, receives a second request, from the personal computing device, for the personal computing device to communicate with the secured network segment. The second request may comprise a second set of security credentials that are based at least in part on the certificate. After receiving the request, the personal device container system may be configured to authenticate the personal computing device to communicate with the secured network segment based on the second set of security credentials.

If the personal device container system authenticates the second credentials, the personal device container system may be configured to create a second network tunnel between the personal computing device and the secured network segment. After the second network tunnel has been created, the personal device container system may be configured to receive secured filter rules for filtering messages communicated via the second network tunnel.

In some embodiments, the determining that the personal computing device has communicated a secured message to a device that is a part of the secured network segment via the second network tunnel, wherein the secured message is compliant with the secured filter rules; and routing the secured message to the device that is part of the secured network segment.

In some embodiments, the personal device container system is configured to determine that a second message has been communicated via the second network tunnel. Further, the personal device container system would be configured to determine whether the second message does not satisfy the secured filter rules. Based on such a determination, the personal device container system would be configured to either forward the secured message or filter the secure message.

In some embodiments, the personal computing device is configured to execute a security function initiated by a remote command. The personal device container system determines that the personal computing device is connected to an unauthorized network and based on such, communicates the remote command to the personal computing device to initiate the security function.

In some embodiments, where the secured message is communicated via the second network tunnel, the secured message may further comprise a geographic location of the personal computing device when the personal computing device communicated the message. The personal device container system may be configured to receive a geographic perimeter from which the personal computing device is allowed to communicate the message over via the second network tunnel to the device located on the secured network segment. Then the personal device container system would be configured to determine the geographic location of the device from the message and determine that the location of the personal computing device is not located within the geographic perimeter. Based on such, the personal device container system would be configured to filter the message.

In some embodiments, the secured network comprises a wireless connection to the secured network. Allowing the personal computing device to connect the secured network would comprise providing a wireless connection to the personal computing device.

In some embodiments, the personal device container system would be configured to receive a third message, communicated via the second network tunnel. The third message is directed to a device that is not located within the secured network segment. After receiving such a request, the personal device container system would be configured to filter the message.

In some embodiments, the request to connect to the provisioning network segment comprises a first secure session identifier (SSID). Additionally, the request to connect to the secured network segment comprises a second SSID. The personal device container system would be configured to create the first network tunnel further based on receiving the first SSID, and create the second network tunnel based on receiving the second SSID.

In some embodiments, the personal device container system comprises a foreign controller, a control point, and an operations router. The foreign controller could be configured to direct communications from the personal computing device to the provisioning segment using the first network tunnel and communications to the secured network segment using the second network tunnel. The control point utilizes the provisioning network rules to filter communications over the first network tunnel. The operations router utilizes the secured network rules to filter communications over the second network tunnel.

In another aspect, a personal computing device is described for presenting a multi-user experience. In some embodiments, the personal computing device comprises at least a processor, a memory, a communication interface in communication with an entity network, a display device, a device configuration file stored in the memory comprising one or more device settings. In some embodiments, the personal computing device is configured to establish network communication with the entity network.

After the personal computing device has established the network communication, the personal computing device may further establish network communication with a personal computing device management system via the entity network and provide device identification information associated with the personal computing device to the personal computing device management system. Based on communicating such information, the personal computing device may receive a certificate from the personal computing device management system and storing the certificate in the memory.

In some embodiments, the personal computing device may be configured to receive settings from the personal computing device management system and updating the device configuration file based on the settings received from the personal computing device management system. The personal computing device may further be configured to receive a command from the personal computing device management system to download an entity application. Based on receiving such a command, the personal computing device may download the entity application and store the entity application in the memory.

In some embodiments, the personal computing device may send a first request to the entity network to connect to a secured network segment in communication with the entity network. As part of the request, the personal computing device may be configured to transmit the certificate to the entity network. Based on communicating the request and the certificate, the personal computing device may receive access to the secured network segment.

In further embodiments, the personal computing device may send a second request to the entity network. The second request may comprise a request to access the secured network segment via the entity application. Based on communicating the second request, the personal computing device may receive a third request from the entity network to provide user credentials. After receiving the third request, the personal computing device may be configured to provide user credentials associated with a first user to the entity network.

In some embodiments, the personal computing device may be configured to receive user-specific content associated with a first user. Upon receiving the user-specific content, the personal computing device may display the user-specific content associated with the first user on the display device using the entity application.

In some embodiments, the personal computing device may further be configured to provide user credentials associated with a second user to the entity network. Based on providing such credentials, the personal computing device may receive user-specific content associated with a second user and display the user-specific content associated with the second user on the display device using the entity application.

In other embodiments, the personal computing device management system may be configured to: (i) validate the device identification information associated with the personal computing device and (ii), if the device identification information associated with the personal computing device is valid, providing the certificate to the personal computing device.

In some embodiments, the entity network comprises a personal device container system. Further, the personal device container system may be configured to establish network communication between the personal computing device and the personal computing device management system.

In other embodiments, the personal device container system is configured to (i) authenticate the certificate transmitted by the personal computing device, (ii) provide the personal computing device access to the secured network segment based on authenticating the certificate transmitted by the personal computing device, and (iii) block network communication between the personal computing device and the secured network segment until the certificate has been authenticated.

While yet in further embodiments, the personal device container system is configured to (i) authenticate the user credentials associated with the first user and (ii), based on authenticating the user credentials associated with the first user, providing the user-specific content associated with the first user to the personal computing device. In other embodiments, the personal computing device may be a tablet computer.

In another aspect of the invention, a system is described for providing multi-user management on a personal computing device. In some embodiments the multi-user management system receives a security credential of a personal computing device. The multi-user management system authenticates the security credential in order to establish a network communication between the personal computing device and a network segment.

In some embodiments, the multi-user management system receives a first request from the user computing device to receive first user-specific information for a first application executed by the user computing device from a secured network segment in communication with the entity network, wherein the request comprises a device identifier and a user identifier associated with a first user, wherein the device identifier is a security certificate.

In another embodiment, the multi-user management system is configured to authenticate the user identifier. Based on authenticating the user identifier, associate the user identifier with the device identifier. Based on authenticating the user identifier, the system may be further configured to communicate a first response to the user computing device.

In yet other embodiments, the system may be further configured to receive a second request from the user computing device to receive second user-specific information associated with the first user for a second application executed by the user computing device from the secured network segment, wherein the second request comprises the device identifier. Based on determining that the device identifier is associated with the user identifier associated with the first user, the system may then communicate a second response to the user computing device.

In yet other embodiments of the invention, the system may receive a third request from the personal computing device, wherein the third request comprises the device identifier and a second user identifier. Based on the third request, the system may disassociate the user identifier with the device identifier based on receiving the third request. The system may also associate the second user identifier with the device identifier based on receiving the third request.

In other embodiments, the system is configured to validate the device identifier to determine that the personal computing device is allowed to communicate requests to devices on the secured network segment.

In yet other embodiments, the system is further configured to determine that the user associated with the first user identifier is authorized to communicate requests to the secured network segment using the personal computing device associated with the device identifier.

In yet other embodiments, the system may be further configured to (i) determine that a pre-defined time period has elapsed after receiving the second request, (ii) determine that the personal computing device has not communicated a subsequent request before the pre-defined period has elapsed, and (iii) disassociating the user identifier and the device identifier based on determining that the personal computing device has not communicated a subsequent request before the pre-defined period has elapsed.

In yet further embodiments, the system may be further configured to (i) receive a third request, wherein the third request comprises a third user identifier, (ii) determine that the third user identifier is not authorized to make requests using the personal computing device, (iii) block the third request based on determining that the third user identifier is not authorized to make requests using the personal computing device.

In other embodiments, where the entity network further comprises a private network segment, the system may be further configured to block communications between the user computing device and the private network segment.

BRIEF DESCRIPTION OF THE DRAWINGS

Figure 1:
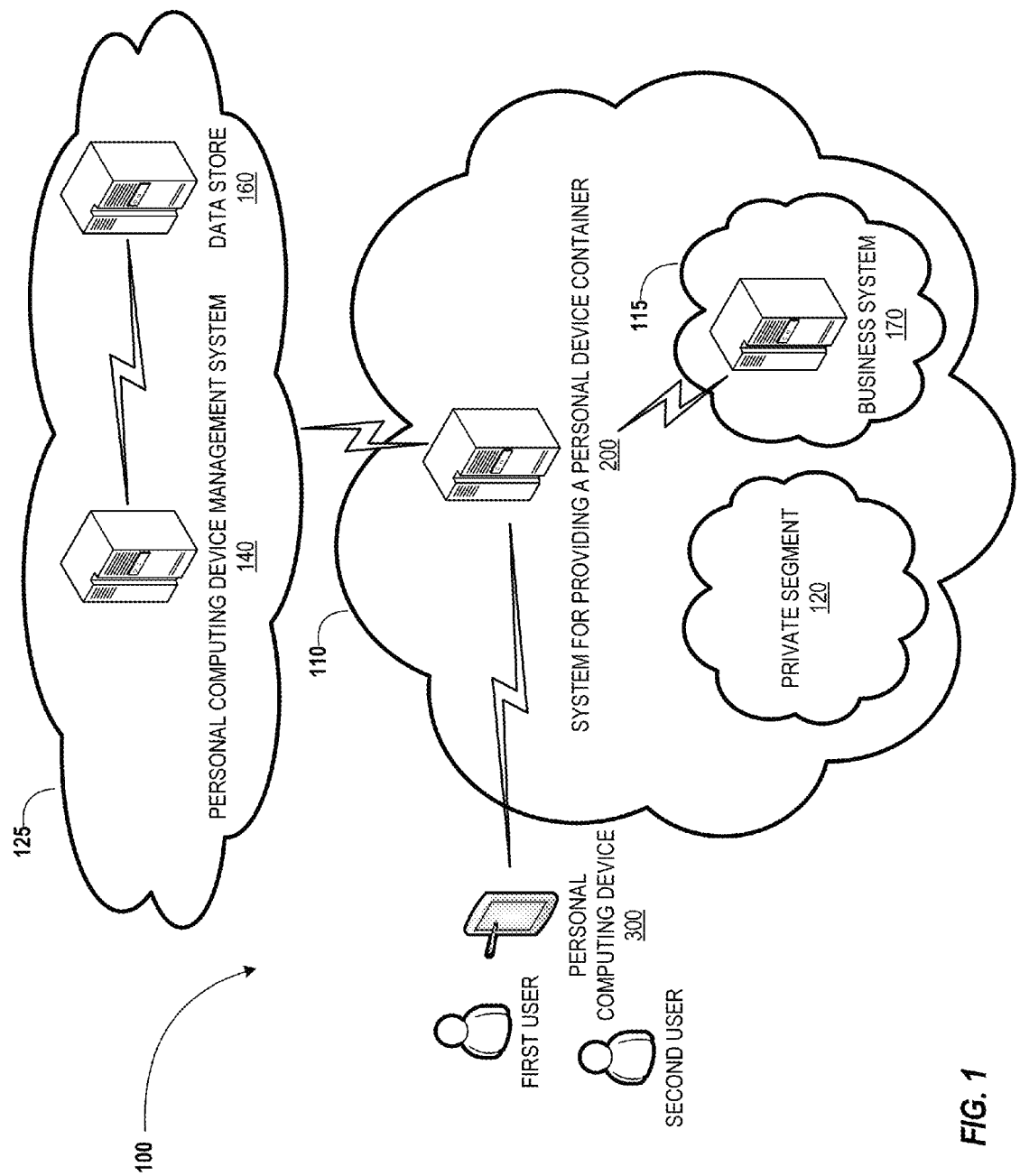
Figure 2:
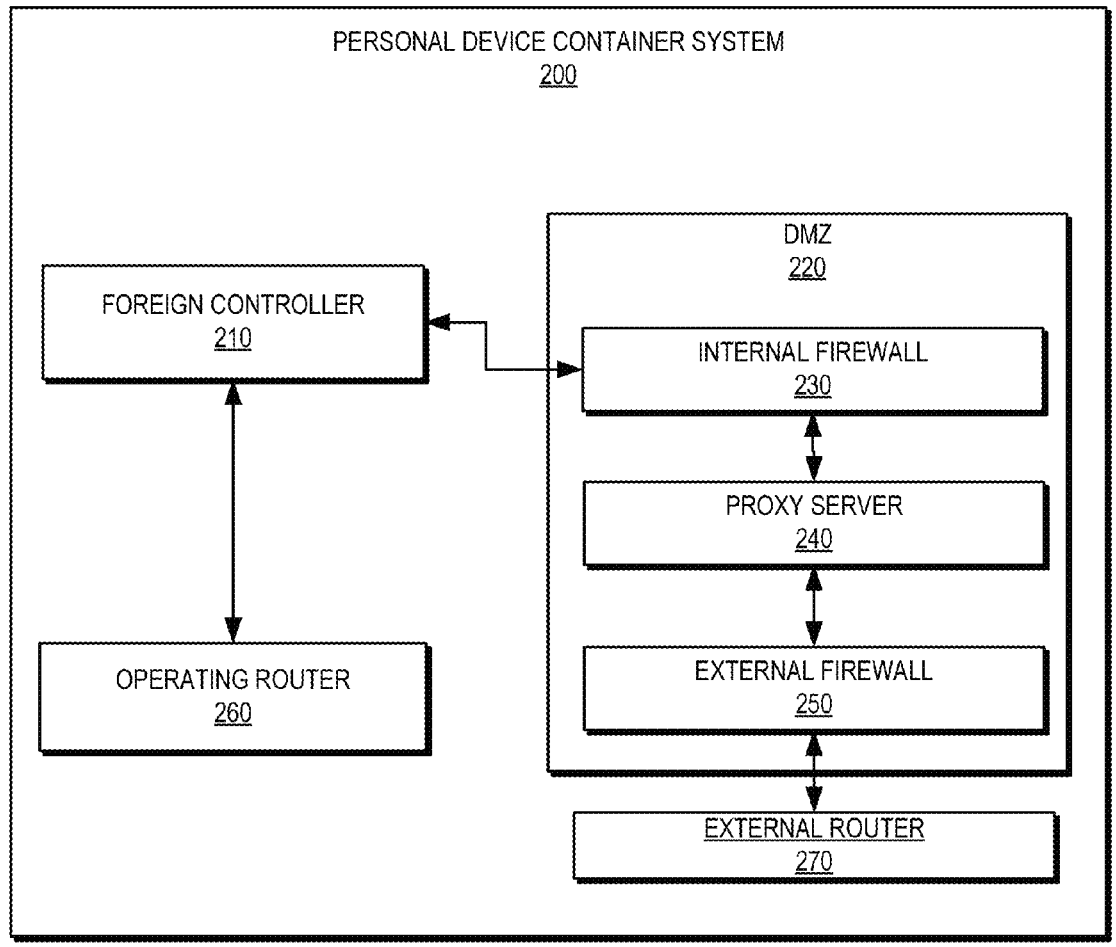
Figure 3:
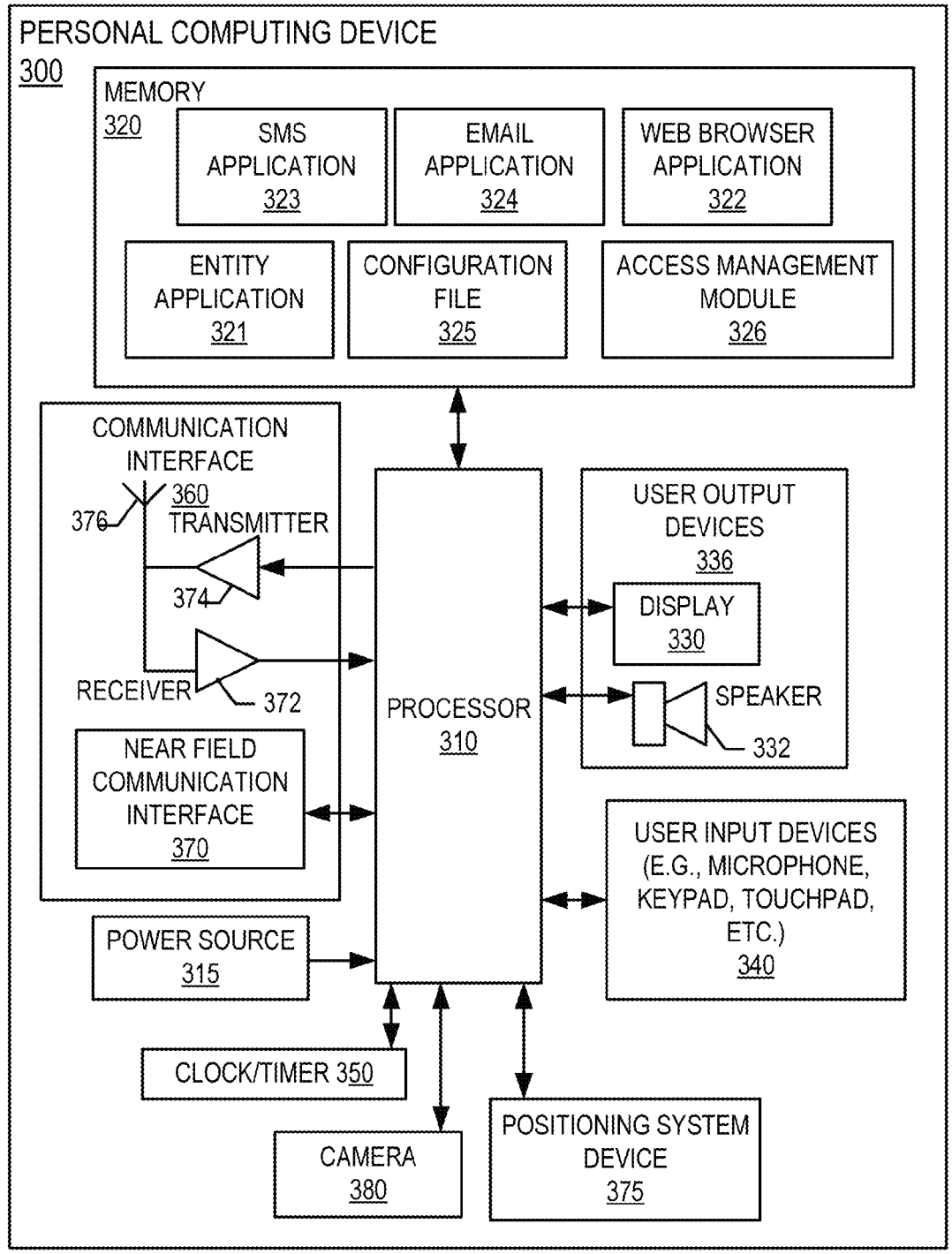
Figure 4:
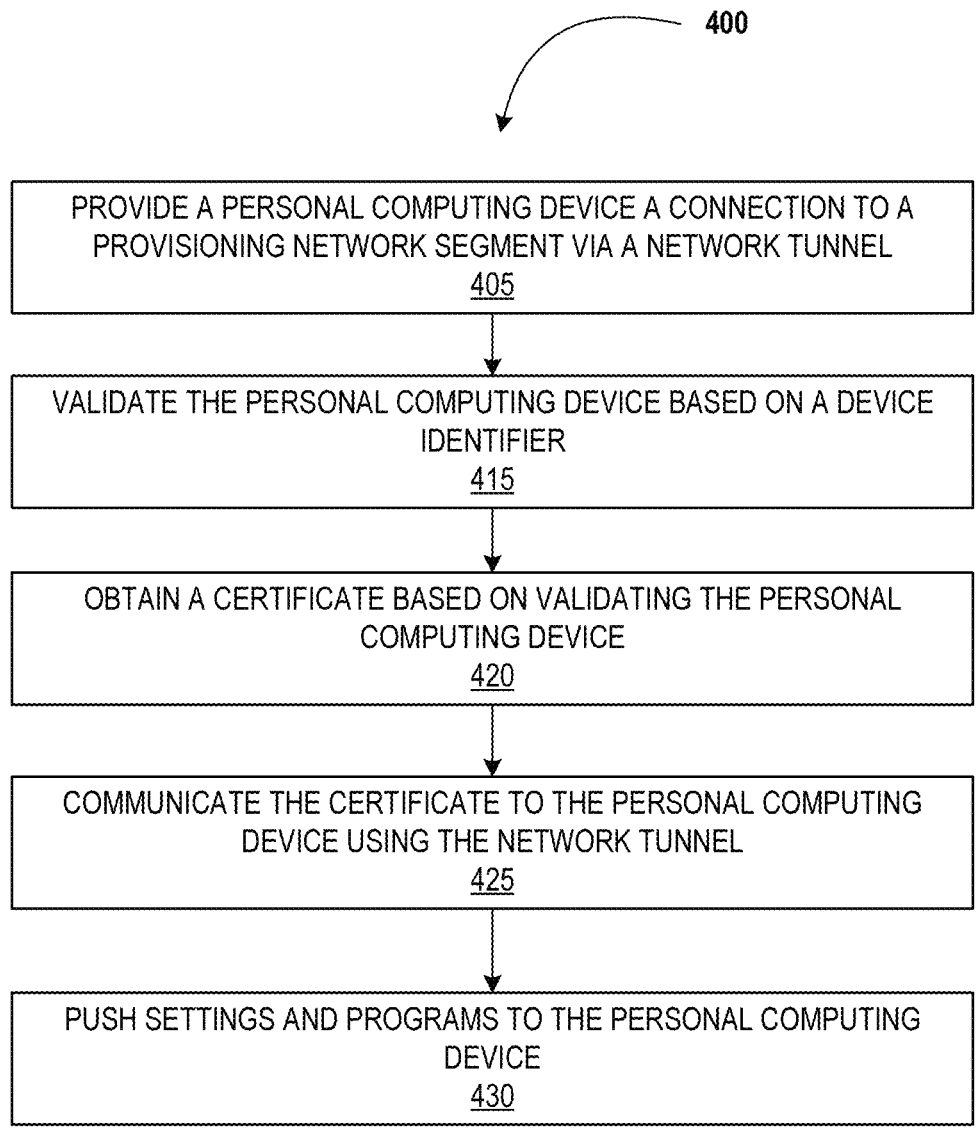
Figure 5:
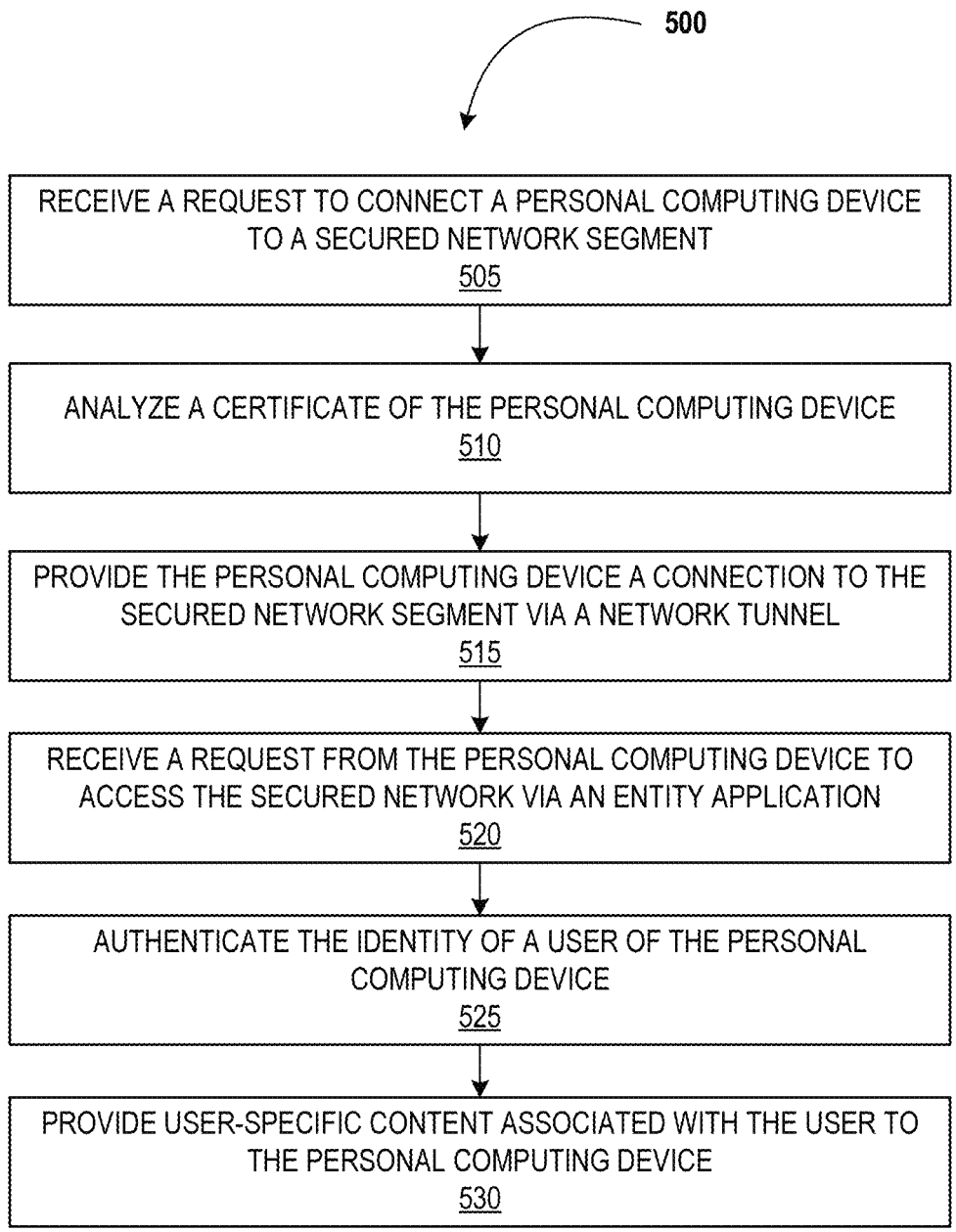
Figure 6:
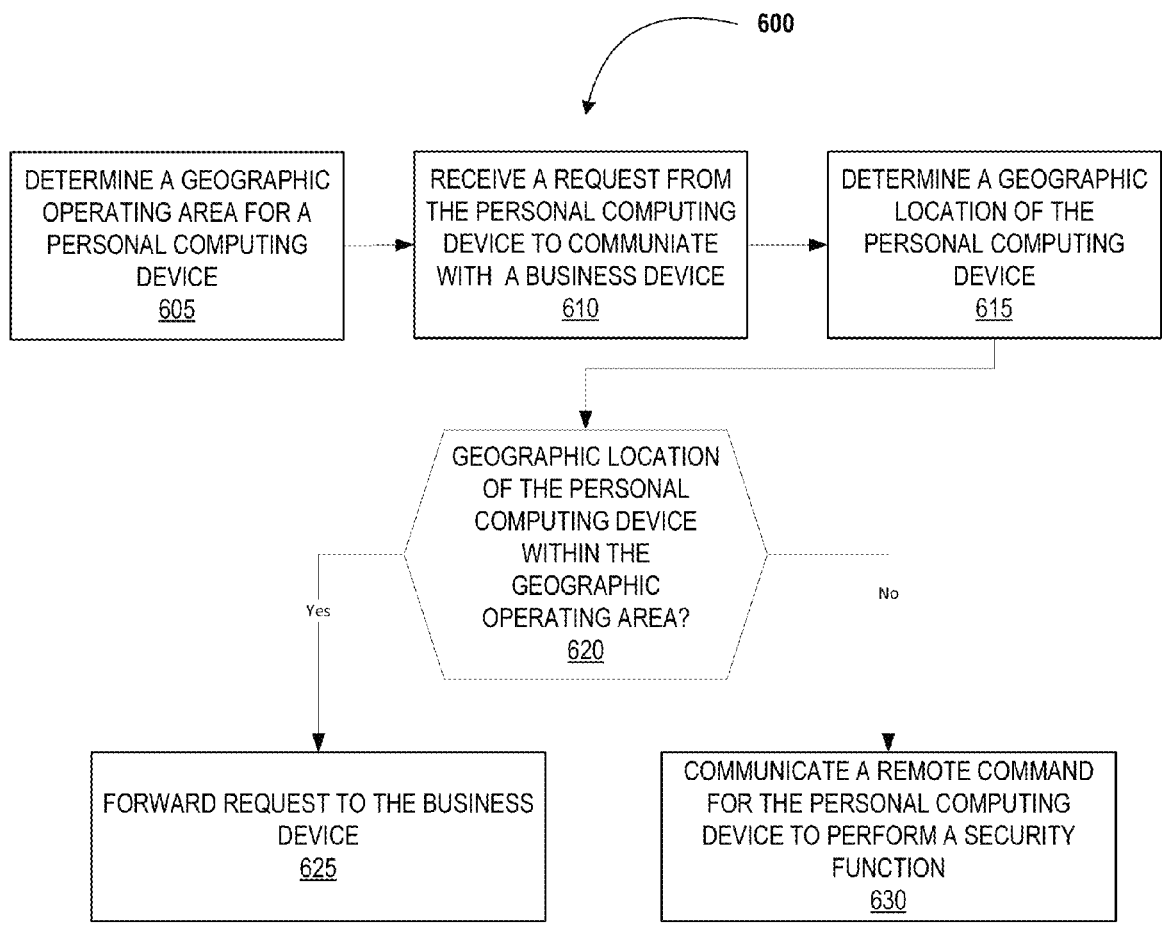
Figure 7:
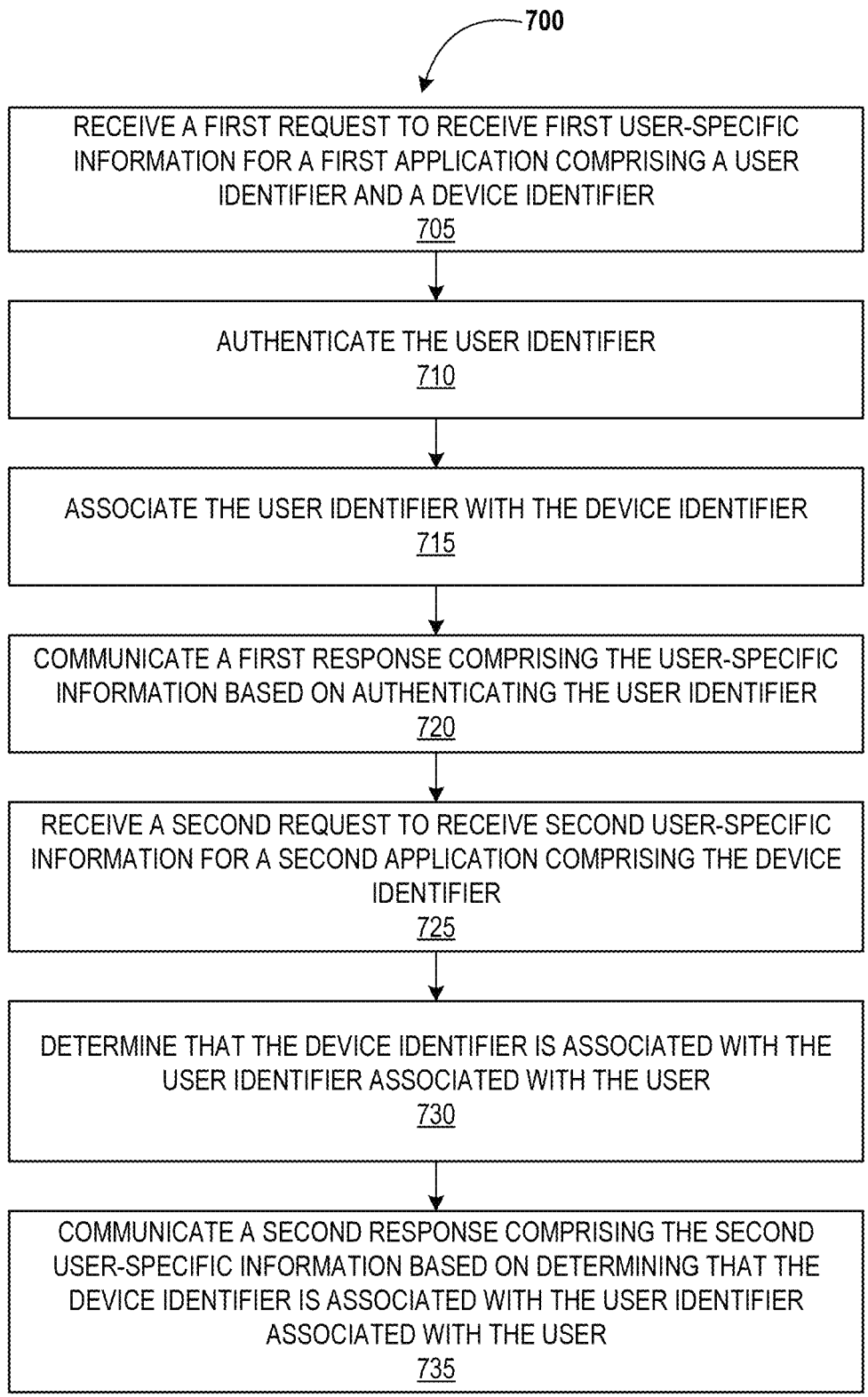

Having thus described embodiments of the invention in general terms, reference will now be made the accompanying drawings, wherein:

FIG. 1 depicts a personal device container system and operating environment in accordance with an exemplary embodiment of the present invention;

FIG. 2 depicts a personal device container system in accordance with an exemplary embodiments of the present invention;

FIG. 3 schematically depicts a personal computing device in accordance with an exemplary embodiment of the present invention;

FIG. 4 depicts a method for provisioning a personal computing device to connect to a secured network with an exemplary embodiment of the present invention;

FIG. 5 depicts a method for granting a personal computing device access to a secured network with an exemplary embodiment of the present invention;

FIG. 6 depicts a method for filtering communication from a personal computing device to a secured network segment based on determining the location of the personal computing device; and FIG. 7 depicts a method for providing multi-user management on a personal computing device.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" and "financial entity" include any organization that processes financial transactions including, but not limited to, banks, credit unions, savings and loan associations, investment companies, stock brokerages, asses management firms, insurance companies and the like. In specific embodiments of the invention, use of the term "bank" is limited to a financial entity in which account-bearing customers conduct financial transactions, such as account deposits, withdrawals, transfers and the like.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that engage in monitoring personal computing devices.

A "user" may be any person or entity using a system as described herein. Often, a user is an employee of an entity (e.g., a financial institution) using the system. In some instances a user has a management position within an entity using the system.

A "network" or "computing network" may refer to any connection between two or more computing devices to facilitate communication between the two or more computing devices. A network may be either wired, wireless, or a combination of wired and wireless. The network shall encompass a local area network (LAN), a wide area network (WAN), and a global area network (GAN) such as the Internet. Additionally, a network may encompass a communication link between two devices using Bluetooth, WIFI, Near Field Communications (NFC), and the like.

"Protocol" shall refer to a common method for communicating between at least two devices on a network. Typically, protocols are designed to communicate a message from an originating device to a destination device. Protocols may also allow the destination device to communicate a response back to the originating device or allow multiple communications between at least the two devices.

"Routing" is defined as a method for transporting a message through an originating device to at least one destination device. As discussed herein, a network may contain routing devices that connect other computing devices together and allow communication between the computing devices. Routing is the method employed by the routers to direct communications between the computing devices. The network may be configured using common routing techniques. A basic network may include a single communication connection between two computing devices where each computing device may both send and receive communications from the other computing device.

Another common network configuration is to use a common router to connect multiple devices. Each device connected to the router communicates a message to another device through the router. Therefore, the router receives all communication on the network. After the router receives the communication, it determines which device to which device to forward to the communication. This network configuration is most common as a network in a home or a small business. This type of network is commonly known as a star topology.

A more expansive network may include multiple routers that intercommunicate. Each router is known to other routers on the network and may both communicate and receive communications from each of the routers. Each router may be connected to multiple computing devices or may be a computing device itself. Additionally, each router on the network may have connections to multiple routers; therefore, allowing for multiples routes between devices. For example, a first router (labeled Router A) may be connected to an originating device and at least two other routers (labeled Router B and Router C). Router B and Router C are further connected to Router D which is further connected to destination device. The originating device may communicate a message to an intended recipient of the destination device. The originating device communicates the message to Router A with instructions to communicate the message to the destination device. Router A may use common techniques to determine the location of the destination device and forward the message accordingly. Router A, because it is connected to both Router B and Router C, may communicate the message to either or both of the routers. Regardless of how Router A forwards the message, the forwarding process continues until the message is received by Router D which in turn forwards the message to the destination device. This type of network is advantageous in that if either Router B or Router C should fail, the other router is still available to allow communication between the originating and the destination computers. This type of network is known as a mesh network.

Networks may further contain different types of networks. For example, a router may be connected to multiple computing devices which are internal to a first network—commonly known as a Local Area Network (LAN). The router may also have a connection with at least one other router and forms a second network—commonly known as a Wide Area Network (WAN). The router acts as a bridge between the LAN and the WAN to transmit communications. The WAN may be built using a mesh network and the LAN built using the star topology.

"Internet Protocol" or "IP" is a common protocol used to route communications across the Internet and other networks. As discussed herein, networks commonly use routers to direct messages between different computing devices. IP directs the router or other addressing server to assign an address to each device on the network in order to identify such device for both sending and receiving communications. This address is commonly known as the IP address. An originating device may communicate a message to an intended recipient using the IP address of the intended recipient. IP additionally, directs routers how to forward messages to other routers so that the message is received by the intended recipient. This is commonly performed using routing tables stored locally or remotely accessible to each router.

Typically, a computing device on a network, in addition to receiving an IP address, comprises numbered ports that are internal to the device. These ports allow communication between an application assigned to the port and other devices on the network. For example, a computing device may run a web server and assign the web server to the common port of 80 to receive and communication messages from the network. The router may be configured to route communications to a given port of the computing device. Additionally, the router may be further configured to automatically route a message to a given port based on a protocol of the message. A common protocol for communicating with a web server is the Hypertext Transfer Protocol (HTTP)—which is based on both the IP and the Transmission Control Protocol (TCP). A router may be configured to forward all HTTP messages to port 80 of a given device. A router may also determine the port based on the address containing the port.

A "Firewall" is a hardware or software device used to filter communication over a network. A firewall may be employed to prevent malicious communication from being sent to or communicated from a computing device. The firewall may be deployed on a computing device, or a router. The firewall may be configured to prevent communication with a given port of a computing device. For example, a firewall may allow access to port 80 of a computing device but prohibit access to all other ports. A firewall may also be configured to filter communications over the network dependent on the originator of the message. For example, the firewall may allow access to a given device if the message originated from a computing device located on the same LAN as the recipient device. The firewall may use an IP address to filter communication as well.

A "Filter Rule" is used by a firewall or similar device to either permit or forbid communication to a device located on the network. The filter rule may filter or permit a communication based on certain parameters of the communication. Such parameters may include an identifier of the sender, an identifier of the receiver, a protocol or language used, a time or day the communication is sent, a specific port of the receiver, and the like. Filter rules may direct a firewall to be inclusive or exclusive with respect to the parameters. Where, a filter rule directs a firewall to be inclusive, the firewall will block all communications except as directed by the filter rule. Inversely, where a filter rule directs a firewall to be exclusive, the firewall will allow all communications except as directed by the firewall. As an example of an inclusive filter rule, a filter rule may direct the firewall to block all communications using TCP except from a sender with a given identifier (i.e. IP Address). As an example of an exclusive filter rule, a filter may direct the firewall to permit all communications to a given computing device except where the communication is directed toward port 22 of any device on the network.

"Tunneling" or "Network Tunneling," as used herein shall be defined as the communication between two devices over a network where the communication comprises at least two protocols. Typically, on a network, a communication sent from an origination device is routed through multiple paths and other devices before arriving at a destination device. Each of these devices uses a common protocol to communicate with other devices to move along information between the originating device and the destination device. If the origination device and the destination desire to communicate using a protocol that is not known to the other routing devices on the network, the other routing devices cannot transfer the communication without some transformation. Tunneling allows this transformation. Tunneling encapsulates a message that is transmitted in a unique protocol that is known between the originating device and the destination device inside a communication that is communicated using a common protocol that is known to all devices on the network. For example, a common protocol used to allow communications between devices on a network is the Internet Protocol (IP). IP is defined in more detail in above. A device on a network may communicate a message using the Transmission Control Protocol (TCP) which relies on IP. The device encapsulates a TCP message within the IP communication. When a routing device on the network receives the IP communication, the device only analyzes the IP communication and not the TCP message.

A network communication may contain further layers of messages each using a different protocol to communicate the respective message. For example, Secure Shell (SSH) is a protocol that allows command line interfacing with a remote computer over a network. Secure Shell relies on both IP and TCP in order to communicate an SSH message across a network. The originating device and the destination device are capable of interpreting and communicating using messages using each of the protocols.

Any one of the layers within a network communication may further be encrypted using any standard encryption. Encryption and decryption of messages may be accomplished using a shared key between the originating and the destination devices, or through an interpreting device. An interpreting device receives encrypted communications from the originating device, decrypts the message using a shared key between the originating device and the interpreting device and then encrypts the message using a shared key between the interpreting device and the destination device. Examples of common encryption techniques include Transport Layer Security (TLS) and Secure Sockets Layer (SSL).

"Control Point" is a network architecture used to protect a network by segmenting off a portion of a network that is used to provide services to an external network. Communications to and from the external network must be received by the control point. Thus, no device that is placed on a network that is not part of the control point may communicate directly with a device that is external to the network. Devices residing within the control point are generally limited to communications that are essential to provide functionality for which the device was configured.

A control point may be established with either one or two firewalls. With respect to a control point that utilizes one firewall, the firewall is connected to the control point, an external network, and devices within the LAN. The firewall handles all traffic on the network. For communications from the LAN to the WAN, the firewall directs such communication to a device within the control point for processing. For communications from the WAN, the firewall directs the communication to a device on the control point where typically the device creates a second communication on behalf of the first communication and directs such communication to the device on the LAN.

With respect to a control point that utilizes two firewalls. The first firewall is placed between the control point and the WAN. The second firewall is placed between the LAN and the control point. Each firewall is configured (as explained herein) to limit traffic between the WAN, the LAN, and the control point.

As an example of a control point, a content provider may host a web server that contains customer private information stored on a database. The LAN comprises the database and other servers that provide business solutions essential to the content provider. The actual web server is hosted within a device on the control point. A firewall is placed between a WAN and the control point that allows access to port 80 of the web server and restricts all other requests. A second firewall is placed between the control point and the LAN that restricts all communication from the LAN to the control point except communication from the database. A web request may be sent over port 80 to the web server. Because the request was sent to port 80 of the web server, the firewall allows the request to pass through. The web server recognizes that it must supply information from the database and sends a request to the database to supply such information. The database responds to the request and communicates a response to the web server. Because the communication is from the database, the internal firewall allows the communication to pass through to the web server. After the web server receives the information from the database, the web server communicates a response to the external network. In this scenario, an external request is not permitted to access the database directly. Additionally, the internal firewall may be configured to only communicate to the web server and no other device external to the LAN. Therefore, the database would be unable to communicate directly to the WAN. Further, the firewalls may restrict communications of the control point itself. For example, a device in the control point may be unauthorized to communicate with a device that is not the database on the LAN.

"Network segmentation" is a network design by which networks are divided into sub-networks or segments. Network segments may be setup using either hardware or software. Typically, a segment is created when the hardware or software restricts communications to a group of devices located on the network. These restrictions may apply to communications being communicated to or communications from the device. The restrictions for a network segment may be based on information associated with the sender of the communication (i.e. IP address, MAC address), a protocol upon which the communication is based (i.e. HTTP, FTP), and/or information associated with the receiving device. Additional restrictions are defined in other places within this specification. Typically, the restrictions for the network segment apply to all devices contained within the network segment equally. In some embodiments, restrictions may be made for individual devices within the network segment.

Devices contained within a network segment typically are not restricted from communicated with one another. However, individual devices may contain security parameters that are managed by the device itself. Although the individual security parameters would restrict communication to the individual device, such parameters are outside the scope of the network segment restrictions.

The restrictions that create the network segments may be implemented by any computing device that is capable of restricting communications over a network. Typical devices may be a firewall, a router, another computing device configured to filter or restrict communications, and the like. A device that is used to employ the restrictions for the network segment may be known as a segment management device.

As an example, a network includes a set of servers that contain sensitive information for the operation of a business. The network further includes standard computers that are operated by individual employees of the business. A firewall is placed between the standard computers and the business servers which contains communication restrictions. All communication between the standard computers and the business servers pass through the firewall. The firewall may include a restriction that all filters all communication from the standard computers based on one or more communication protocols.

In addition to restricting communications, the network segment may also establish a separate addressing system for the devices contained within the segment. The segment may further determine how communications originating from outside the segment should be routed within the segment. The segment management device may determine how to route such communication. In some embodiments, a device external to the network segment may communicate a message to the segment management device. The segment management device may have a logic table to forward such communication. The segment management device may forward a communication based on the same principles that the device would use to restrict communications. For example, a device may receive a communication based on the HTTP protocol. Based on receiving such a communication, the segment management device may forward that communication to a given device contained within the network segment. Additionally, the segment management device may be further configured to forward communication to a device contained within the network segment based on the address of the device. For example, a device external to the segment knows the address of the recipient device within the network and communicates a message to the recipient device. Although, the segment management device receives the message, the segment management device may direct the message accordingly based on additional restrictions and routing information.

A single router may be used to create network segments by acting as a firewall between the two given segments. In this method, even though the router may be connected to multiple computing devices, the router assigns each computing device to a respective network and using software, filters the communication between each computing device. The router may create the network segment by implementing filtering rules. These rules may define either inclusive or exclusive. As an example of an inclusive filter rule, the router may block all traffic to a given device that is not communicated from using TCP. Therefore, the rule permits TCP communication. As an example of an exclusive filter rule, the router may allow all traffic to a given device except communications that are communicated from a particular IP Address. Therefore, the device prohibits communication.

It should be understood that a computing device located within a segment may also be part of another segment based on communication channels of the device. A given device may have multiple channels by which the device communicates. Each communication channel may be tied to a different segment. Therefore, the device may be part of multiple segments. For example, a device may communicate wirelessly with another device located on a first network segment. The device may also communicate with a second device via a wired network link which is part of a second network segment. The device would be part of both the first and the second network segments. A device within a segment may have access (restricted or unrestricted) to communicate with other devices on the segment. Therefore, if a device is a part of multiple segments, the device may have access (restricted or unrestricted) to each segment upon which the device is a part.

In one aspect, the present invention embraces a method of providing a multi-user experience on a personal computing device, typically a personal computing device provided by an entity, such as a financial institution, for the use of one or more employees or other users. In this regard, it has been found to be difficult to provide a multi-user experience via the operating system of certain personal computing devices (i.e., by relying upon the personal computing device's operating system to recognize and provide a user-specific experience to different users). Accordingly, the present invention typically provides a multi-user experience via one or more applications provided by the entity to the personal computing device.

In another aspect, the present invention embraces a personal device container system, in which the system may be used by the entity to provide the personal computing device with secured access to entity systems, update settings and perform upgrades on the personal computing device, and monitor functional requests between the device and other computing devices located on the secured network. It has been found that conventional Network Access Control (NAC), which is a common way of controlling the access to a network, is not compatible with many personal computing devices. Accordingly, the present invention typically provides a personal device container (i.e., secured access to a network segment).

In particular embodiments of the invention, the personal computing device may be configured to allow a user to access applications that are stored on and executed by the personal computing device. The personal computing device may provide the user with a login screen that requires the user to provide necessary credentials. The personal computing device may require the user to supply such credentials prior to the user accessing an application. After the user has supplied the personal computing device the credentials, the personal computing device may submit such credentials to an authorization system to validate such credentials. The authorization system may validate such credentials and communicate a response to the personal computing device that allows the user to access at least one of the applications.

In some embodiments, the user, based on the response that the credentials were validated, may be granted access to other applications on the personal computing device. For example, a personal computing device may execute two applications. When a user attempts to access one of the applications, the authorization system may require the user to provide the necessary credentials (e.g., via the personal computing device). After the user supplies the credentials and the authorization system may grant the user the ability to access the first application. When the user attempts to access the second application, the authorization system may not require the user to enter additional credentials.

The authorization system may determine that after a given amount of time of the user not accessing an application on the personal computing device, the user must resupply the credentials before granting access to the application. In addition, the authorization system may also place other restrictions for a user accessing the applications, such as a determining the location of the personal computing device.

The applications stored on and executed by the personal computing device may rely on user-specific information. Such information may be hosted on a computing device located on a network. Based on the receiving the response stating the user credentials were validated, the authorization system may receive requests to supply user-specific information. Based on receiving such a request, the authorization system may transmit the request to another computing device capable of fulfilling the request or answer the request.

Where the personal computing device communicates a request to validate the credentials of the user, the personal computing device may, as a part of the request, communicate a device identifier of the personal computing device. The authorization system that receives the request may also receive the device identifier and associate the user with the device based on the user credentials and the device identifier. Such association may be shared with other devices on the network such as the computing device that receives the request for user-specific information from the computing device. Therefore, when the personal computing device communicates a request for user-specific information, the computing device that receives such a request may return a response containing the user-specific information. If the personal computing device submits a subsequent request for user-specific information for a second application to another computing device, the association may be shared with the other computing device and the other computing device may recognize the user and return a reply containing the user specific information.

The authorization system may also perform limitations on requests received from the personal computing device. For example, if a second user were to supply user credentials to the personal computing device after the user credentials from the first user were validated and the authorization system created the association, the authorization system could disassociate the first user with the personal computing device. The authorization system may further associate the second user with the personal computing device. Additionally, where at least one computing device that supplies user-specific information has not received a request to supply user-specific information for a given user within a given amount of time, the authorization system may disassociate the user with the personal computing device. Therefore, any further request from the personal computing device for user-specific information would be denied by the computing device supplying such information.

It should be noted that the authorization system described herein may be a part of a segmented network of a network and provide authentication of user credentials to devices within the segmented network. In other embodiments, the authorization system may remain apart from a segmented network and provide authentication to multiple network segments. It should also be noted that the computing device that receives requests to supply user-specific information may also perform the functionality of the authorization system.

In this regard, FIG. 1 depicts an operating environment 100 according to one embodiment of the present invention that provides multiple users of a personal computing device with secured access to certain systems of an entity (e.g. a financial institution). The operating environment may depict a network layout where communication between the devices is represented. It should be understood that this is a general embodiment of the invention and the invention may further include other network hardware to accomplish the same functionality as described herein. It should be also understood that all communications between the respective devices on the network may be accomplished using any type of network infrastructure including both wired and wireless communication. The operating environment 100 depicted in FIG. 1 includes a personal device container system 200, a personal computing device management system 140, a data store 160, a business system 170, and a personal computing device 300. The operating environment 100 further illustrates an entity network 110 and a provisioning network segment 125.

The entity network may include network segments that are sub networks of the entity network. Each segment of the entity network 110 is created based on a set of communication restrictions being placed on devices contained within the segment. The personal device container system 200 may be used to execute these restrictions.

In the current invention, the entity network 110 contains at least a secured network segment 115. The entity network 110 may further contain other segments, such as the private segment 120.

The personal device container system 200 is typically in network communication (e.g., via the entity network 110) with at least the personal computing device management system 140, the data store 160, the personal computing device 300, and the business system 170. The personal device container system 200 acts as a segment management device for managing communication between the different network segments for provisioning the personal computing device 300 and managing communications between the personal computing device and the secured network segment 115. To provision the personal computing device 300, the personal device container system 200, provides a connection for the personal computing device to the personal computing device management system 140. The personal computing device management system 140 may be contained within the provisioning network segment 125. After the personal computing device 300 has been provisioned, the personal device container system 200 provides a connection between the personal computing device and the business system 170 contained within the secured network segment 115.

The personal device container system 200 may contain at least one processing device that is connected to at least one communication device and at least one storage device. The at least one storage device may contain code that is executable by the at least one processing device to perform receive requests for provisioning a personal computing device 300, and communicating with computing devices within the secured network segment 115. The executable code may further direct to the at least one processing device to establish network tunnels, filter communications, and determine the location of the device.

With respect to network segmentation, one method for segmentation includes placing communication controls over a segment of the network. Such controls may be established using a firewall or other similar device. For example, a business server that communicates over a network contains sensitive data. A firewall may be placed to restrict communication to the business server to prevent certain communication with the server. Within the present invention, various embodiments of the invention utilize network segmentation in order to provide additional security. In one embodiment, the business system 170 may reside in a segmented network. In some embodiments, the segmented network may be the secured network segment 115 of the network 110. Accordingly, the personal device container system 200 may include communication controls to restrict access to the business system 170 based on the restrictions of the secured network segment. These communication controls may be described using filter rules.

The personal computing device 300 allows a user to access specific functionality over the network 110. The personal computing device 300 connects through the network 110 in order for the personal computing device 300 to be provisioned and in order to communicate with the business system 170 within the secured network segment 115. The personal computing device 300 is typically provisioned by communicating with the personal computing device management system 140 and the data store 160. In some embodiments, the personal computing device communicates though the personal computing device management system 140 and the data store 160 by communication with the personal device container system 200.

With respect to provisioning the personal computing device 300, in some embodiments, the personal computing device 300 typically receives a certificate as part of the provisioning process. The certificate may allow the personal computing device to connect to the secured network segment 115 through the personal device container system 200 to submit requests and receive responses from the business system 170 contained within the secured network segment 115.

Typically, the personal computing device 300 is a mobile device, such as a cell phone, smart phone, personal digital assistant (PDA), tablet computer, or any other suitable mobile electronic device. More typically, the personal computing device is a tablet computer. The personal computing device 300 may connect with the network using either a wired or wireless connection, although the personal computing device 300 typically connects using a wireless connection. The personal computing device 300 may be configured to be restricted in the networks which it might join or may be designed to allow connection to any network. In some embodiments of the present invention, the personal computing device is allowed to communicate with the personal device container system 200 as explained herein.

In some embodiments, the personal computing device 300 may reside in a segmented network where each branch of the entity which is physically located from the other branches is a segmented network. For example, the personal computing device 300 may connect to a secured network segment 115 by sending a request to the personal device container system 200. The personal device container system 200 may utilize a WIFI router that is physically located within the same location as the personal computing device to receive such a request. The WIFI router may be part of the same segmented network as the device 300. The personal device container system 200 provides a connection between the segmented network containing the personal computing device and the secured network segment 115. In some embodiments, the personal device container system 200 prohibits communication from the personal computing device to other segments of the network. The personal device container system 200 may determine a segment of the network for which the personal computing device is prohibited from communicating.

In other embodiments, the personal device container system 200 may determine a segment which the personal computing device may communicate with based on security credentials contained within the router. Where the router allows the personal computing device to connect via WIFI or other wireless communication types, the router may set multiple WIFI access points each of which have different security credentials and access to a different segment of the network. For example, a user may receive a new personal computing device 300 which is preconfigured with multiple applications which communicate with a business system 170. The business system 170 is typically on a different segment than the personal computing device. A WIFI router provides access to the network and broadcasts multiple network access points. The device may access a first network access point using a simple password. The first network access point may provide the personal computing device 300 the ability to communicate to the personal computing device management system 140 and the data store 160 for provisioning. In some embodiments, the personal computing device management system 140 and the data store 160 are contained within a segment of the network 110. In other embodiments, the personal computing device management system 140 and the data store may further be contained in a network that is separate from the network 110.

To setup multiple points of access, the WIFI router may be configured to establish a Secure Session Identifier (SSID). In order for a wireless device to connect to the network using the WIFI router, the personal computing device must connect to the WIFI Router using the SSID. The SSID may be part of the credentials necessary to connect to the network. In some embodiments, a single router may allow connection to a network using multiple SSIDs. Where a router is configured to allow multiple SSIDs for connecting to a network, the router may create segments on the network to prevent communication between devices that have connected using different SSIDs. For example, a business may establish a first SSID using a wireless router. When a device connects to the first SSID of the router, the device becomes part of a first network segment that communicates with devices that are internal to the business. In addition, the business may also offer a second SSID for visitors. Devices that connect using the second SSID are prohibited from communicating with devices that are inside the first segment.

In the present invention, when the personal computing device 300 connects to the network, the personal computing device may connect to the network 110 through a WIFI router using an SSID. In some embodiments, the personal device container system 200 determines that the personal computing device 300 has connected to the network using a specific SSID. In specific embodiments of the invention, a WIFI router may be configured to broadcast two SSIDs. The first SSID may be related to the provisioning network segment 125. The second SSID may be related to the secured network segment 115. The personal device container system 200 may determine based on the personal computing device connecting to the network 110 using the first SSID to direct communication between the personal computing device 300 and the secured network segment 125. Additionally, the personal device container system 200 may direct communications between the personal computing device 300 and the secured network segment 115 based on the personal computing device connecting to the network 110 using the second SSID.

The personal computing device management system 140 typically provides credentials to the personal computing device in order for the personal computing device to communicate over a secured network, such as the secured network segment 115. The personal computing device management system 140 also manages settings, configurations, and programs on the personal computing device. The personal computing device management system 140 may be configured to communicate with the data store 160 in order to gather information related to the personal computing device necessary to provision the personal computing device and to manage settings, configurations, and programs on the personal computing device. The personal device container system 200 may restrict how the personal computing device management system 140 communicates with the personal computing device. The personal computing device management system 140 may be a system that is operated by the entity or by a third party. In some embodiments, the functionality of the personal computing device management system 140 may be performed by the personal device container system 200.

The data store 160 may contain information related to the personal computing device, such as device identification associated with the personal computing device. The system may store information necessary to provision the device, such as a certificate. The system may also store information used to manage settings, configurations, and programs, such as configuration files or programs to be uploaded to the personal computing device. The data store may be any medium to store data, including, but not limited to, a relational database, an object oriented database, a file store, and the like. The data store may communicate with the personal device container system 200 to receive the information related to the personal computing device 300.

The secured network segment 115 of the network 110 may contain computing devices that restrict communications received from and transmitted to devices outside the secured network segment, such as communications with the personal computing device 300. An embodiment of one of these computing devices is the business system 170. The business system 170 may represent an entire network architecture of an entity that is meant to be secured and segmented from the rest of the network. The business system 170 may contain computing devices, servers, data stores, and the like in order to accomplish any function of the business. Such functionality may include, but is not limited to, managing email, storing information, hosting servers, and the like. The business system 170 may connect to the personal device container system in order to provide information related to requests from the personal computing device. The business system 170 may also connect to other networks that are not represented within FIG. 1. In some embodiments, the personal device container system 200 restricts access to and from the business system with the rest of the network. For example, the personal computing device management system 140 and the data store 160 may be prohibited from communicating with the business system and the personal computing device 300 may be prohibited from communicating directly with the business system 170. In other embodiments, the personal device container system may provide limited functionality to and from the business system. For example, the personal computing device 300 may receive email from the business system 170 but may be restricted from access to all other functionality of the business system 170.

FIG. 2 depicts an exemplary embodiment of a personal device container system 200 for directing communication from a personal computing device for provisioning the personal computing device and subsequently providing communication between the personal computing device and computing devices contained in a secured network segment. In some embodiments of the invention, the personal device container system is a computing device capable of routing requests between various network segments of the network 110 and various devices in communication with the network 110, such as the personal computing device 300.

The personal device container system 200 typically includes devices (e.g., routers and firewalls) to filter communications both internal and external to the network 110. The personal device container system 200 may also include computing devices and hardware to limit and even prohibit communications with other network segments such as the private segment 120 contained within the network 110. As depicted within FIG. 2, the personal device container system 200 may comprise a foreign controller 210, a control point 220, an operating router 260, and an external router 270. It should be understood that the personal device container system 200 represented in FIG. 2 is a general embodiment of the present invention and may include other hardware and software devices to assist the personal device container system in performing the functionality for which it is configured. Each device that performs a filtering function within the personal device container system 200 may implement filter rules to accomplish this function.

The foreign controller 210 is presented as a computing device that provides communication support from the personal computing device 300 to the operating router 260 and the control point 220. The foreign controller 210 may provide firewall functionality under which it restricts communications from the personal computing device 300 to the control point 220 and the operating router 260. The foreign controller may provide the personal computing device 300 a connection either using a wireless or a wired connection. Additionally, in some embodiments, the foreign controller may connect with other networks such as a mobile network or networks external to the network presented in order to connect the personal computing device with the rest of the network. For example, the personal computing device 300 may be located in a physical location of the entity.

In specific embodiments, the foreign controller 210 routes traffic to either the control point 220 or the operating router 260. Prior to the personal computing device 300 being provisioned, the foreign controller may process a request from the personal computing device to become provisioned. The foreign controller 210 routes such a request to the control point. Typically, before the personal computing device 300 has become provisioned, if the personal computing device attempts to communicate with the secured network segment 115, the foreign controller 210 will filter (and block) such a request. After the personal computing device 300 has become provisioned, the foreign 210 may process a request from the personal computing device to communicate with a device on the secured network segment 115 (e.g., by routing such request to the operating router 260). The foreign controller may determine how to route such requests based on whether the device has been provisioned. The foreign controller may determine whether the personal computing device 300 is provisioned based on authenticating a certificate the personal computing device receives upon being provisioned. The personal computing device may use the certificate to request to communicate with the secured network segment 115 via the personal device container system 200.

In some embodiments, the foreign controller 210 may filter (and block) communication to other segments of the network 110. Such a segment is illustrated as the private segment 120. In such an embodiment, the foreign controller 210 may entirely block communication between the personal computing device 300 and the private segment 120 (e.g., regardless of whether the personal computing device 300 has a valid certificate) but may allow the personal computing device 300, once it has a valid certificate, to communicate with the secured network segment 170 and devices contained therein.

In some embodiments, the location of various network components and hardware may be physically located apart from one another. Connecting a standard network connection may be undesirable or infeasible. In such a situation, connecting the various devices through the Internet may be a practical means of creating a network connection. Such a connection may be accomplished using Network Tunneling. The entity may utilize a local WIFI router that is connected to a local internet service provider (ISP). The ISP provides a connection to the Internet which in turn is connected to the foreign controller 210. It is generally understood communications between the foreign controller 210 and the personal computing device 300 will typically pass through multiple routers, switches and the like in order for such a communication to be transmitted. In order to provide secure communication between the foreign controller 210 and the personal computing device 300, the foreign controller may be configured to establish a network tunnel, as defined herein, to securely transmit such communications.

As depicted within FIG. 2, the personal device container system 200 may employ the control point 220 to handle communications between the personal computing device 300 and the personal computing device management system 140. The control point 220 may be any standard network architecture that provides functionality substantially similar to that explained herein. In some embodiments, the control point comprises an internal firewall 230, a proxy server 240, and an external firewall 250. The foreign controller 210 communicates with the internal firewall 230 in order to forward communications from the personal computing device 300 to the personal computing device management system and receive responses back from the personal computing device management system. The internal firewall 230 restricts types of communication from the personal computing device 300. These restrictions may be either by protocol (i.e. HTTP, TCP), by an address or identifier of the personal computing device 300, and by destination (i.e. an address of the personal computing device management system). Specifically, the internal firewall 230 may restrict all access from the personal computing device such that it is limited to communicating directly with the personal computing device management system 140. Further communications to the personal computing device management system 140 may be limited to requests for provisioning. The internal firewall 230 may reject all other communications 230.

The personal computing device management system 230 communicates with the proxy server 240. In general, a proxy server is designed to receive a request from a given computing device and forward that request to the intended recipient of the request. A typical request will have an address of the requestor attached to the request. Some recipients of a request will reject the request if the sender cannot be identified by an approved sender. Therefore, any communication from a sender that is not approved will be rejected. A proxy server allows the request to change its address to that of the proxy server. Therefore, if the address of the proxy server is approved by the recipient, the request will be granted regardless of the address of the sender. In some embodiments, the personal computing device management system 140 requires a specific address be attached to a request before the personal computing device management system will receive such a request. The personal computing device management system 140 may be configured to accept communication from the proxy server 240 based on the address of the proxy server. Therefore, any communication directed to the personal computing device management system 140 from the personal computing device 300 will be approved by the personal computing device management system. Additionally, the proxy server 240 may store an identifier of the request to determine the actual sender of the request; otherwise, if the recipient made a reply, the proxy server would not be able to forward the response to the sender. By storing an identifier associated with the request, when the proxy server 240 receives a response from the personal computing device management system 140, the proxy server may forward such response to the personal computing device 300.

The proxy server 240 is directly connected to an external firewall 250. Similar to the internal firewall 230, the external firewall 250 restricts communications. However, the external firewall 250 restricts communications from external the network to the internal portions of the network. The external network 250 may employ the same filters as the internal firewall 240 to restrict such communications. In a specific embodiment, the external firewall 250 restricts all communications external from the network except communications from the personal computing device management system 140. Further, the external firewall 250 may restrict communications from the personal computing device management system to any device except the personal computing device 300 and such communications may be further limited to a response to a provisioning request. In other embodiments, the restrictions may be less sever and may allow other communications external to the network.

The external firewall 250 is connected to an external router 270. The external router directs communications from the personal computing device 300 to the personal computing device management system 140. Similar to the foreign controller 210, the external router 270 may communicate indirectly with the personal computing device management system 140. This communication may comprise transmitting the communication through the Internet, routers, switchers, servers and the like. Similar to the foreign controller 210, the external router 270 may establish a network tunnel in order to secure the communication between the personal computing device 300 and the personal computing device management system.

The operating router 260 is connected to the foreign controller 210. The operating router 260 may further be connected to the business system 170 and other entities that may be external to the network. Similar to both the foreign controller 210 and the external controller 270, the operating router 260 may be configured to create a network tunnel to transmit communications securely through external networks. In this regard, the business system 170 may be physically located in a facility different from the personal device container system 200 and the personal computing device 300. The network tunnel adapts other networks as if they were extensions of the base network. The operating router communicates requests from the personal computing device 300 and returns responses to the personal computing device 300. In some embodiments, the operating router 260 acts as a firewall in which it restricts communications from the personal computing device 300 and the business system 170. Such restrictions may be based on the functionality of the personal computing device 300. Such functionality may be either inherent to the personal computing device or may be manually configured. For example, a personal computing device 300 may be configured to receive and send email and all other functionality restricted. The operating router 260 may be configured, when a request is received from the personal computing device 300, to determine the whether the request is either to receive or send email. If the request is for sending and receiving email, the operating router 260 may permit the request to pass. If the request is for something other than that which is approved for the personal computing device 300 is configured to perform, the operating router 260 rejects such a request.

In addition to acting as a firewall, the operating router may also provide multi-user management for the personal computing device 300, where the personal computing device is configured for multi-user support as defined within this specification. The personal computing device 300 may be configured to provide a multi-user experience for the personal computing device 300. In some embodiments where the personal computing device 300 is configured to provide multi-user support, the operating router 260 may access information related to users and the personal computing device in order to direct communications between the personal computing device and different network segments.

Referring now to FIG. 3, the personal computing device 300 associated with the user and embodied as a mobile device is described. FIG. 3 provides a block diagram illustrating personal computing device 300 in accordance with embodiments of the invention. However, it should be understood, however, that a mobile device is merely illustrative of one type of personal computing device 300 that may benefit from, employ, or otherwise be involved with embodiments of the present invention and, therefore, should not be taken to limit the scope of embodiments of the present invention. The personal computing device 300 may include other types of mobile devices which may include portable digital assistants (PDAs), mobile telephone, smartphones, or any other mobile device.

The personal computing device 300 generally includes a processor 310 communicably coupled to such devices as a memory 320, user output devices 336, user input devices 340, a communication interface 360, a power source 315, a clock or other timer 350, a camera 380, and a positioning system device 375. The processor 310 generally includes circuitry for implementing communication and/or logic functions of the personal computing device 300. The processor 310 can additionally include an internal data modem. Further, the processor 310 may include functionality to operate one or more software programs, which may be stored in the memory 320. For example, the processor 310 may be capable of operating a connectivity program, such as a web browser application 322. The web browser application 322 may then allow the personal computing device 300 to transmit and receive web content, such as, for example, location-based content and/or other web page content, according to a Wireless Application Protocol (WAP), Hypertext Transfer Protocol (HTTP), and/or the like.

The processor 310 is configured to use the communication interface 360 to communicate with one or more other devices on the network. In this regard, the communication interface 360 includes an antenna 376 operatively coupled to a transmitter 374 and a receiver 372 (together a "transceiver"). The processor 310 is configured to provide signals to and receive signals from the transmitter 374 and receiver 372, respectively. In some embodiments where network is a wireless telephone network, the signals may include signaling information in accordance with the air interface standard of the applicable cellular system of the wireless telephone network. In this regard, the personal computing device 300 may be configured to operate with one or more air interface standards, communication protocols, modulation types, and access types. By way of illustration, the personal computing device 300 may be configured to operate in accordance with any of a number of first, second, third, and/or fourth-generation communication protocols and/or the like. For example, the personal computing device 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The personal computing device 300 may also be configured to operate in accordance with non-cellular communication mechanisms, such as via a wireless local area network (WLAN), near field communication network, or other communication/data networks.

The communication interface 360 may also include a near field communication (NFC) interface 370. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 370 may include a smart card, key card, proximity card, Bluetooth® device, radio frequency identification (RFID) tag and/or reader, transmitter, receiver, and/or the like. In some embodiments, the NFC interface 370 communicates information via radio, infrared (IR), and/or optical transmissions. In some embodiments, the NFC interface 370 is configured to operate as an NFC transmitter and/or as an NFC receiver (e.g., an NFC reader). Also, it will be understood that the NFC interface 370 may be embedded, built, carried, and/or otherwise supported in and/or on the personal computing device 300. In some embodiments, the NFC interface 370 is not supported in and/or on the personal computing device 300, but the NFC interface 370 is otherwise operatively connected to the personal computing device 300 (e.g., where the NFC interface 370 is a peripheral device plugged into the personal computing device 300). Other apparatuses having NFC interfaces mentioned herein may be configured similarly. In some embodiments, the NFC interface 370 of the personal computing device 300 is configured to contactlessly and/or wirelessly communicate information to and/or from a corresponding NFC interface of another apparatus (e.g., another mobile or computing device).

As described above, the personal computing device 300 has a user interface that is made up of user output devices 336 and/or user input devices 340. The user output devices 336 include a display 330 (e.g., a liquid crystal display or the like) and a speaker 332 or other audio device, which are operatively coupled to the processor 310. The user input devices 340, which allow the personal computing device 300 to receive data from a user, may include any of a number of devices allowing the personal computing device 300 to receive data from a user, such as a keypad, keyboard, touch-screen, touchpad, microphone, mouse, joystick, other pointer device, button, soft key, and/or other input device(s). The user interface may also include a camera 380, such as a digital camera.

The personal computing device 300 may also include a positioning system device 375 that is configured to be used by a positioning system to determine a location of the personal computing device 300. For example, the positioning system device 375 may include a GPS transceiver. In some embodiments, the positioning system device 375 is at least partially made up of the antenna 376, transmitter 374, and receiver 372 described above. For example, in one embodiment, triangulation of cellular signals may be used to identify the approximate location of the personal computing device 300. In other embodiments, the positioning system device 375 includes a proximity sensor or transmitter, such as an RFID tag, that can sense or be sensed by devices known to be located proximate a merchant or other location to determine that the consumer personal computing device 300 is located proximate these known devices.

The personal computing device 300 further includes a power source 315, such as a battery, for powering various circuits and other devices that are used to operate the personal computing device 300. Embodiments of the personal computing device 300 may also include a clock or other timer 350 configured to determine and, in some cases, communicate actual or relative time to the processor 310 or one or more other devices.

The personal computing device 300 also includes a memory 320 operatively coupled to the processor 310. As used herein, memory includes any computer readable medium (as defined herein below) configured to store data, code, or other information. The memory 420 may include volatile memory, such as volatile Random Access Memory (RAM) including a cache area for the temporary storage of data. The memory 320 may also include non-volatile memory, which can be embedded and/or may be removable. The non-volatile memory can additionally or alternatively include an electrically erasable programmable read-only memory (EEPROM), flash memory or the like.

The memory 320 can store any of a number of applications which comprise computer-executable instructions/ code executed by the processor 310 to implement the functions of the personal computing device 300 described herein. For example, the memory 320 may include such applications as one or more entity applications 321 (i.e., applications provided by the entity to the personal computing device via the personal device container system), conventional web browser application 322, a SMS application 323, and a conventional email application 324. These applications typically provide a graphical user interface (GUI) on the display 330 that allows a user to interact with these applications. The memory 320 may include an access management module 326 that manages the personal computing device's access to entity networks and systems as described herein. The memory 320 typically includes one or more configuration files 325 having personal computing device settings stored therein.

In some embodiments, the entity applications 321 may be used to provide various functions to users of the personal computing device 300. For example, an entity application may provide email access, access to intranet sites operated by the entity, and/or web browsing functionality. An entity application may provide marketing materials that can be provided to a customer by a personal computing device user. The entity applications 321 may provide users with secured access to various entity systems via the personal device container system. One or more of the entity applications may provide for a multi-user experience. Such an entity application may prompt a user to provide user-specific security credentials (e.g., username and password), which are then authenticated by the personal device container system. Once the user has been authenticated, user-specific content can be provided (e.g., access to the user's email account). In some instances, user-access to an entity application or to certain entity systems via an entity application may be restricted (e.g., via the personal device container system) depending upon the identity of the user (e.g., only certain users may be able to access certain entity systems).

The memory 320 can also store any of a number of pieces of information, and data, used by the personal computing device 300 and the applications and devices that make up the personal computing device 300 or are in communication with the personal computing device 300 to implement the functions of the personal computing device 300 and/or the other systems described herein. For example, the memory 320 may include credentials provided by the personal computing device management system 140 once the personal computing device 300 has been provisioned. In addition, the memory 320 may include user-specific security credentials that can be used to verify the identity of a specific user (e.g., a first user or a second user).

Before the personal computing device 300 can connect to the secured network segment 115, the personal computing device must first be supplied with proper credentials. In this regard, FIG. 4 depicts a method 400 for provisioning the personal computing device 300 so that the personal computing device 300 has the credentials needed to subsequently connect the personal computing device to the secured network segment. The method includes the steps of: providing a personal computing device a connection to a provisioning network segment as depicted in block 405, creating a network tunnel between the device and the personal computing device management system as depicted in block 410, validating the personal computing device based on a device identifier as depicted in block 415, retrieving a certificate based on validating the personal computing device as depicted in block 420, and communicating the certificate to the personal computing device using the network tunnel as depicted in block 425. Each of the steps of method 400 will be more fully explained.

Block 405 of method 400 depicts providing a personal computing device a connection to a provisioning network segment 125. As explained within this specification, a network may contain network segments each of which filter incoming and outgoing communications to protect the computing devices contained within the network segment. In some embodiments of the invention, the personal computing device 300 is not yet provisioned to communicate on the secured network segment 115. The personal computing device 300 must be provisioned prior to communicating on the secured network segment 115. In some embodiments, the personal computing device may first connect to a provisioning network segment 125 in order to receive the necessary credentials to become provisioned. The personal device container system 200 may provide such access using a router physically located near the personal computing device. In some embodiments, the router may provide either a wired or wireless access point for the personal computing device to connect the provisioning network segment 125. Where the connection is a wireless connection, the router may establish an (Secure Session Identifier) SSID to which the personal computing device may use to connect. The SSID may be part of a set of security credentials needed to communicate with the provisioning segment 125. As explained herein, the personal device container system 200 may determine an SSID that the personal computing device 300 has utilized to connect to the network 110. Using this determination, the personal device container system 200 may direct communication to different segments of the network 110.

In addition to providing the access point to the personal computing device to connect to the provisioning network segment, the personal device container system 200 may further provide an address to personal computing device. In some embodiments, the provisioning network segment is a segment of a larger network to which the secured network is also a segment.

In some embodiments, providing the personal computing device 300 access to the provisioning network segment requires the personal computing device to provide security credentials to the router or the personal device container system 200. The security credentials may be preconfigured into the personal computing device 300 or manually entered by a user. The SSID may be part of the security credentials.

Typically, the personal computing device 300 or the router may be directly connected to the personal device container system 200. However, in larger entities, the personal computing device and a WIFI router may be physically different location than the personal device container system 200 and other devices contained within the network 110. Therefore, a direct connection between the personal computing device and the network 110 may not be practical. Instead, it may be more likely that the router is provided a connection to the Internet by an internet service provider (ISP) which connects to the personal device container system 200. As a result, security may be a concern for communicating across this spectrum. In some embodiments, the personal device container system 200 may use the foreign controller 210 and/or the external router 270 to establish a network tunnel in order to provide a secure channel of communication between the personal computing device 300 and the personal computing device management system 140. The network tunnel may provide layers of security by layering communications using different protocols. In addition to using different protocols, the layers may additionally include encryption.

The personal device container system 200 routes the communication from the personal computing device to the network provisioning segment 125. Specifically, the communications from the personal computing device 300 are received by the personal computing device management system 140 and the data store 160. The personal device container system 200 is typically configured to automatically rout communications from the personal computing device 300 to the network provisioning segment 125 if the personal computing device 300 connects to the network 110 using a first SSID. The personal device container system 200 may further require the personal computing device to supply additional credentials in order to connect to the network provisioning segment 125. The additional credentials may include a password. In some embodiments, where the personal computing device is connected to the provisioning network segment 125, the personal device container system 200 may restrict the personal computing device 300 from communicating with any device located on the network 110 except the personal computing device management system 140. Specifically, the personal device container system 200 would block communications from the personal computing device to any device on the secured network segment 115, such as the business system 170. As explained in other areas of the specification, the communication from the personal computing device 300 to the personal computing device management system 140 may pass through the control point 220 of the personal device container system 200. Additionally, the personal device container system may be configured to restrict communication from a device that does not contain an approved address (i.e. IP address). As such, the control point 220 typically provides a proxy server 240 to provide an authorized address for the personal computing device. The internal firewall 230 may also restrict communication to the personal computing device management system and other systems that are external to the network. These restrictions may be based on the address of the personal computing device 300, the protocol the personal computing device used to communicate the request, and the intended recipient of the request.

Block 415 of method 400 depicts validating the personal computing device based on a device identifier (i.e., device identification information associated with the personal computing device). The device identification information associated with the personal computing device may be any information sufficient to generate a device "fingerprint," or unique signature of the customer's personal computing device. Device identification information may be collected from a variety of sources. In some embodiments, the device identification information includes an identification code. The identification code may be but is not limited to a serial number or an item number of the device. In some embodiments, the device identification information may be associated with a chip associated with the personal computing device. The chip may be but is not limited to a subscriber identification module (SIM) card, removable hard drive, processor, microprocessor, or the like. In other embodiments, the device identification information may be associated with a removable part of the personal computing device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the personal computing device. This unique key, code, or piece of software may then serve as device authentication information. In some embodiments, device identification information may need to be entered manually at the personal computing device. For example, the online banking system may prompt the customer for manual entry of the device identification information (e.g., a serial number, an identification code, an International Mobile Station Equipment Identity (IMEI), a phone number, a chip, a removable part, or similar pieces of device identification information). In other embodiments, device identification information may not be based on user input received at the personal computing device. Instead, the device identification information may be automatically provided by the personal computing device. In yet another embodiment, the personal computing device may provide the information without requiring user input after receiving a request from the online banking system for the identification information.

In order the validate the personal computing device, the personal device container system 200 grants the personal computing device 300 access to the personal computing device management system 140 and the data store 160. Such a request is directed by the personal device container system 200 to the personal computing device management system 140 and the data store 160. The request may contain the device identifier of the personal computing device. Alternatively, the device identifier may be provided by the personal computing device 300 after receiving a request for the device identifier from the personal computing device management system 140. In some embodiments, through the personal computing device management system 140, the device identifier is checked against a list of devices each of which are allowed to be provisioned. The list of devices is stored within a data store, such as the data store 160, which may either be a part of the network or external to the network. In any case, if the device identifier matches the corresponding device identifier of one of the devices located on the approved device list, the personal computing device management system 140 may continue with the provisioning process. In the event that the device identifier is not located on the list of approved devices, the personal computing device management system may record the device identifier and further reject any attempt of the personal computing device to become provisioned. Additionally, because the personal device container system 200 provides communication to other segments on the network, the personal device container system may restrict any communication from the rejected device on the network.

Block 420 of method 400 depicts obtaining a certificate based on validating the personal computing device. In this regard, after the personal computing device management system 140 has validates the personal computing device, the personal device container system 200 may generate a certificate which allows the personal computing device 300 to gain access to the secured network segment 115 and then provides the certificate to the personal computing device management system 140. In some embodiments, rather than the personal device container system 200 generating the certificate, the personal computing device management system 140 may retrieve an appropriate certificate, such as from a data store (e.g., data store 160) or from another system. In some embodiments, the certificate is based on Transport Layer Security (TLS) protocol and further encrypted using the Advanced Encryption Standard (AES). It should be understood that any encryption standard may be used to develop the certificate.

Block 425 of method 400 depicts communicating the certificate to the personal computing device using the network tunnel. In some embodiments, either the personal computing device management system 140 or the personal device container system 200 communicates the certificate to the personal computing device over the secured tunnel. After communication with the personal computing device is complete, the personal device container system 200 may terminate the secure tunnel.

Once the personal computing device 300 has been supplied the certificate, the personal computing device management system 140 may, as shown in Block 430, push certain settings, configurations, and programs to the personal computing device 300. For example, the personal computing device management system 140 may configure the personal computing device 300 so that the personal computing device's networking and security settings comply with entity requirements. In some embodiments, these settings and configurations may block or restrict the use of certain programs (e.g., by disabling productivity programs other than the entity applications 321) residing on the personal computing device or certain functionality of the personal computing device. In addition, the personal computing device management system 140 may cause the personal computing device 300 to download one or more entity applications 321. Although the personal computing device management system 140 is typically configured to push settings and programs to the personal computing device 300 upon providing the certificate to the personal computing device 300, the personal computing device management system 140 may at any time subsequent thereto update settings or programs on the personal computing device 300, or provide new programs or new configuration files to the personal computing device 300. For example, the personal computing device management system 140 may be configured to provide updated program and settings to the personal computing device 300 at regular intervals (e.g., daily, weekly, or monthly).

Once the personal computing device obtains the certificate, the personal computing device 300 may be granted access to the secured network segment 115. In this regard, FIG. 5 depicts a method 500 for granting a personal computing device 300 access to a secure network. Method 500 provides steps for receiving a request to connect a personal computing device to a secured network as depicted in block 505, analyzing a certificate (e.g., a security certificate) of the personal computing device as depicted in block 510, and providing the personal computing device a connection to the secured network as depicted in block 515.

Block 505 of method 500 illustrates receiving a request to connect a personal computing device to a secured network segment. After receiving the certificate, the personal computing device 300 may connect and communicate with the personal device container system 200 in order to connect to the secured network segment 115. In some embodiments, the router that hosted the access point to the provisioning network segment may also provide a second access point using an SSID that is different than the SSID described in method 400. In other embodiments, a second router may be used. The personal computing device 300 sends a request to connect to the personal device container system 200 by accessing a second access point. The personal computing device 300 submits such a request using the certificate. The personal device container system 200 receives the request and determines based on the certificate whether to grant the personal computing device 300 access to the secured network as depicted in block 510 of method 500. In this regard, the personal device container system 200 typically verifies the authenticity of the certificate of the personal computing device 300. In some embodiments, the personal device container system 200 provides its own certificate to the personal computing device 300, which the personal computing device 300 subsequently authenticates. Accordingly, mutual authentication may be provided for communication between the personal computing device 300 and the network 110.

After verifying (e.g., authenticating) the certificate, the personal device container system 200 may provide the personal computing device a connection to the secured network segment 115 via a network tunnel as depicted in block 515 of method 500. In the event that the personal device container system 200 cannot validate the certificate, the personal device container system may block communication between the personal computing device 300 and the secured network segment 115. In the event that the personal device container system 200 cannot validate the certificate, the personal device container system may also perform a security function such as adding the certificate and the device identifier to a blacklist, communicating a message to a user or other authority detailing the attempted access, communicating a message to the personal computing device on further instructions for connecting the devices, and the like.

In some embodiments, the personal device container system 200 grants the personal computing device 300 access to the secured network segment 115 (e.g., by creating a network tunnel). The network tunnel may be continuous and direct between the personal computing device and system or may be accomplished using multiple tunnels. Where the network tunnel is accomplished using multiple tunnels, the foreign controller 210 of the personal device container system 200, may create a first network tunnel between the personal computing device 300 and the personal device container system 200. The operating router 206 may create a second tunnel between the personal device container system 200 and the business system 170. The foreign controller 210 and the operating router 260 may communicate message between the two tunnels. In some embodiments, the tunnels are only created when the personal computing device 300 transmits a request to the business system 170 and the tunnels are terminated when the business system 260 has communicated the response to the request. In other embodiments, the tunnels are persistent.

In other embodiments, the foreign controller 210 and the operating router 260 may be configured to filter requests from the personal computing device 300 and the devices located on the secured network segment 115, such as the business system 170. In such an instance, the foreign controller 210 and the operating router 260 may be configured as firewalls. Such filtering may be as a result of functionality of the personal computing device 300. Such functionality may be inherent to the personal computing device or manually asserted. For example, a personal computing device that has been provisioned to communicate over a secured network with a business system has been configured to send and receive emails with an email server on the business system. If the personal computing device 300 sends an email, either the foreign controller 210 or the operating router 260 may determine that the personal computing device has the ability to perform the function and forward the request. However, if the personal computing device 300 attempts to perform a function for which the device 300 has not been configured, the foreign controller 210 or the operating router 260 may reject such request. The personal device container system 200 may store permissions (i.e., functionality permitted by the personal device container system 200) for each device it manages. Therefore, a first personal computing device may be permitted to perform certain functionality that a second personal computing device is not permitted to perform. Therefore, the foreign controller 210 or the operating router 260 may limit communication requests from the second device and forward communication requests from the first device, depending upon the functions each device is permitted to perform.

In block 520, a request is received (e.g., received by the personal device container system 200 or the business system 170) from the personal computing device 300 to access the secured network via a particular entity application. In this regard, a first user of the personal computing device 300 may initiate the particular entity application (e.g. by selecting an icon for the entity application). The entity application may be an application that provides user-specific content (e.g., access to the first user's email or access to certain files of the first user stored on the business system 170). The entity application may be an application that provides user-restricted content (i.e., content that certain users can access but other users cannot access). In some embodiments, the entity application may be an application that provides content that is not restricted (e.g., marketing materials to be provided to customers).

In block 525, the identity of the first user of the personal computing device 300 is authenticated. In this regard, the personal device container system 200 or the business system 170 (i) may determine that the entity application is an application that accesses user-specific and/or user-restricted content and (ii), based on this determination, may send a request to the personal computing device 300 for the first user to provide the first user's credentials. Thereafter, the first user may provide the first user's credentials to the personal device container system 200 or the business system 170, which the personal device container system 200 or the business system 170 then authenticates. User credentials may be any information, such as a username, password, passcode, personal identification number, and/or biometric information, that can be used to authenticate the identity of a user of the personal computing device 300. If the first user's credentials, then the personal device container system 200 or the business system 170 may block the entity application from accessing content on the secured network segment (e.g., content stored by the business system 170). If the entity application is an application that does not access user-specific and/or user-restricted content, then the personal device container system 200 or the business system 170 may allow the entity application to access content on the secured network segment (e.g., content stored by the business system 170).

In block 530, based on the identity of the first user being authenticated, the personal device container system 200 or the business system 170 may permit the personal computing device to access user-specific and/or user-restricted content associated with the first user via the entity application. Once this content has been received by the personal computing device it may be displayed to the first user via a display device of the personal computing device. In this regard, such content may be displayed within a graphical user interface provided by the entity application. Although the identity of the first user has been authenticated, the personal device container system 200 or the business system 170 is still typically configured to block access to user-specific content not associated with the first user and to user-restricted content that the first user does not have permission to access. In addition, based on the identity of the first user, the personal device container system 200 or the business system 170 may allow the first user to have access to certain functionality provided by the business system 170 but may block other functionality provided by the business system 170.

Thereafter, if a second user wishes to use the entity application on the personal computing device 300, the second user must provide the second user's credentials before user-specific and/or user-restricted content associated with the second user can be accessed via the entity application. Accordingly, the entity applications can be employed as a secured way of provided user-specific content to different users of the personal computing device 300.

FIG. 6 depicts a method 600 for filtering communication from a personal computing device 300 to a secured network segment 115 based on determining the location of the personal computing device. Block 605 of method 600 depicts determining a geographic operating area for a personal computing device. The personal device container system 200 may be configured to determine a geographic operating area for the personal computing device 300. The geographic operating area may be a predefined location defined by the entity, such as a certain entity facility. The predefined location may be location information for geographic locations proximate to an entity facility. This location information may include the address, GPS coordinates, longitude and latitude, location name, and/or any other information sufficient to identify the geographic operating area. In some embodiments, the location information may include one or more geo-fences that reflect the geographic operating area. A geo-fence is a virtual perimeter that defines the boundaries of an actual geographic area. In some embodiments, the location information associated with the geographic operating area may be identification information associated with a wireless network (e.g., a wireless network associated with an entity facility).

Block 610 of method 600 depicts receiving a request from the personal computing device to communicate with a business device within the secured network segment 115. As explained herein, the personal computing device 300 communicates with different computing devices, such as the business system 170, to perform functions and receive information. The information communicated from the business system 170 may be sensitive information. Accordingly, the entity that manages such information may desire to protect the dissemination of such information. Therefore, the entity may establish additional security measures to control the communication of the information. In one embodiment, the personal device container system 200 may filter requests based on the location of the device.

To assist in securing information received on a personal computing device, the personal device container system 200 may determine the geographic location of the personal computing device as depicted in block 615 of method 600. In some embodiments, where the personal computing device is configured with a means for determining location (i.e. GPS), the device may transmit a location when it receives a request from the system. The personal device container system 200 may determine based on such a location to send the command to perform the security function. Additionally, the personal device container system 200 may further determine if the personal computing device 300 is utilizing an unauthorized network to communicate. The personal computing device 300 may be configured to perform a security feature such as lock the device, wipe the memory of the device, or communicate a message to a user or another authority. In yet other embodiments, the personal computing device may be configured with a short range communication interface (e.g. a Bluetooth or NFC interface). The device may communicate with an emitter that provides credentials to the device. Such credentials are passed on with a request from the personal computing device.

Block 620 presents determining whether the geographic location of the personal computing device is within the geographic operating area. In some exemplary embodiments, determining whether the geographic location of the personal computing device is within the geographic operating area includes determining whether the geographic location information associated with the personal computing device is within a geo-fence associated with the predefined location. In some exemplary embodiments, determining whether the geographic location of the personal computing device is within the geographic operating area includes determining whether the location information associated with the personal computing device is located within a predefined distance from the predefined location. It will be appreciated that any approach to determining that the personal computing device is located within a predetermined distance from the predefined location may be used. For example, a computer processor may compare the GPS coordinates associated with the personal computing device with the GPS coordinates associated with the predefined location and calculate a distance. The predefined distance may be a few meters, tens of meters, or an even larger distance. The predetermined distance is somewhat influenced by the margin of error associated with the relating to the location of the personal computing device to the location associated with the predefined location. The more accurate the location information, the tighter range that can be selected for the predefined distance. In some exemplary embodiments, determining whether the geographic location of the personal computing device is within the geographic operating area includes determining whether the personal computing device is in communication with a predefined wireless network (e.g., a local area network associated with a predefined location).

If the personal computing device 300 is located within the geographic operating area, the personal device container system 200 may forward the request to the business device (e.g., the business system 170) as depicted in block 625 of method 600. If the personal computing device is not located within the geographic operating area, the personal device container system may communicate a remote command for the personal computing device to perform a security function, as depicted in block 630 or method 600. The security function may be for the device to perform a wipe of information stored on the personal computing device. In another embodiment, the security function may be for the personal computing device 300 to lock. While in another embodiment, the security function may be for the personal computing device 300 to display a message stating the personal computing device is not within the geographic operating area. In addition to the above stated security functions, the personal device container system 200 may additionally perform functions as a result determining whether the location of the personal computing device is within the geographic operating area. Such functions may include, sending a message to a user or another authority that location of the device, and limiting functionality of the types of requests the personal computing device 300 may communicate.

In some embodiments, when credentials are received from the personal computing device 300, the personal device container system 200 may determine whether the credentials are appropriate. If the credentials are not appropriate, the personal device container system 200 may communicate the command to perform the security function to the personal computing device 300. In addition to sending the command for the device to perform a security function, the personal device container system 200 may simply filter the request instead of forwarding the request to the intended recipient. As a specific example, a financial institution may have a provisioned personal computing device that communicates with the personal device container system 200 in order to setup and manage financial accounts on behalf of a customer. In order for the device to send a request to perform this function, the device must be connected to a secure network and be within a given distance of a Bluetooth emitter. If the device is not connected to the secure network, the personal device container system will filter the request and send a command to the device to both wipe and lock the device. If the device is not within the given distance of the Bluetooth emitter, the personal device container system 200 may send a command to the personal computing device to lock the device and filter the request.

FIG. 7 depicts a method 700 for providing multi-user management on a personal computing device 300. In some embodiments, the operating router 260 may be configured to provide multi-user management for the personal computing device 300. Although this method demonstrates that each step may be performed via the operating router 260, a computing device such as the business system 170 located on the secured network segment 115 may provide the multi-user management functionality and perform each of the steps of method 700. As explained herein, the personal computing device 300 may be configured to provide a multi-user experience, wherein different users may login and access applications executed by the personal computing device to view user specific information via the personal computing device 300.

In some embodiments of the invention, prior to the user being able to communicate a request using the personal computing device for user specific information, the user computing device must be authenticated. Such authentication may be performed using the secured certificate as defined herein.

Block 705 of method 700 receiving a first request to receive first user-specific information for a first application comprising a user identifier and a device identifier. In specific embodiments, the personal computing device 300 may provide a user an opportunity to supply user credentials for the purpose of gaining access to at least one of the applications stored on and executed by the personal computing device 300. The operating router 260 may prevent the user from accessing an application executed by the personal computing device until after the operating router has authenticated the user identifier. After receiving the credentials from the user, the personal computing device 300 may submit a request containing the credentials to the operating router 260. In some embodiments, the credentials may be a user identifier such as a username, an email address or the like. Additionally, the request may further contain a device identifier. The device identifier may be a security certificate (e.g., a certificate provided to the personal computing device during provisioning), a manufacturer identification (i.e. serial number), or an identifier that is specific to the network 110 (i.e. IP Address).

After the operating router 260 receives the request, the operating router may be configured to authenticate the credentials and user identifier as illustrated in Block 710 of method 700. The operating router 260 may authenticate the user credentials based on receiving user-specific information. For example, the user credentials may comprise the user identifier and a password. The operating router 260 may search a data store containing the user identifier and password and matching the user identifier with the password in order to perform the validation.

In some embodiments, the operating router 260 may be further configured to determine whether the user associated with the user identifier is allowed to make requests using the personal computing device 300 to receive user-specific information. Such a determination may be based on the device identifier. For example, the operating router 260 may access a data store containing information that allows a user to perform such requests via a given personal computing device. Where the data store contains information suggesting the user is allowed to make such a request, the operating router 260 may proceed with block 715 of method 700. Otherwise, the operating router 260 may communicate a response to the personal computing device stating the user is not authorized to communicate requests with the given personal computing device.

After the operating router 260 has authenticated the user identifier, the operating router may associate the user identifier with the device identifier as depicted in block 715 of method 700. The personal computing device may receive a response from the operating router 260 stating that the user credentials have been validated.

In addition, based on authenticating the user identifier, the user may be granted access to any or some of the applications executed by the personal computing device without having to supply additional credentials. Such a response may be the response as illustrated in block 720 of method 700. Additionally, after the operating router 260 has authenticated the user identifier, the operating router 260 may direct the request to a specific device located on the secured network segment 115. Based on receiving the request, the device located on the secure network segment 115, may communicate a response containing the user-specific information. The operating router 260 may receive this response and forward the response back to the personal computing device 300.

Block 725 of method 700 illustrates receiving a second request to receive second user-specific information for a second application comprising the device identifier. Based on the operating router 260 authenticating the user identifier, the user may be granted access to at least one other application executed by the personal computing device. Where the user has been granted access to more than one application, additional applications may require user-specific information in addition to that supplied by the first application. The operating router 260 may receive a request for the additional user-specific information. In some embodiments, the request for the additional user-specific information may comprise at least the device identifier.

Based on receiving the second request, the operating router 260 may determine that the device identifier is associated with the user identifier associated with the user as depicted in block 730 of method 700. Since the user identifier has already been validated and associated with the device identifier, when the operating router 260 receives the device identifier, the operating router may automatically determine the user based on the association between the user identifier and the device identifier. Base on making such a determination, the operating router 260 may forward the request to a computing device on the segmented network 115 and receive a response containing the additional user-specific information. The operating router 260 may then communicate the user-specific information to the personal computing device 300 as depicted in block 735 of method 700. In other embodiments, the operating router 260 may be configured to restrict requests from the personal computing device 300 to computing devices located on the secured network segment 115.

In one embodiment, the operating router 260 may receive a request to validate a second user using the personal computing device 300. Based on the operating router 260 receiving such a request, the operating router may disassociate the first user with the personal computing device 300. Thereafter, if the operating router 260 receives a request from the first user using the personal computing device 300, the operating router 260 may filter the request until the personal computing device has resent a subsequent request to validate the user credentials of the first user.

In other embodiments, the operating router 260 may be configured to block requests based on not receiving a request for user-specific information within a given amount of time. The operating router 260 may determine a time threshold for receiving a request for user-specific information from a user after the operating router has authenticated the user identifier for a user. If the operating router 260 receives a request before the expiration of the time threshold, the system may extend the time threshold for a later period of time. However, if the operating router 260 has not received a request for user-specific information, the operating router may disassociate any user that is currently associated with the personal computing device 300.

In yet other embodiments, the operating router 260 may determine that a user is not authorized to utilize a personal computing device 300 to receive user-specific information. The system may receive information relating to a given user's ability to use a given personal computing device. For example, where an entity has multiple business centers, the entity may authorize an employee who works in one center to have access to personal computing devices that are assigned to that center. If the employee attempts to access an application on the personal computing device assigned to that center the operating router 260 will not block the request. However, if the user travels to another center and attempts to use a device that the employee has not been authorized to use, the operating router 260 may block such a request. The operating router 260 may determine whether the user is authorized to use a personal computing device 300 based on receiving the user identifier and the device identifier. The system may access a list of authorized users for a given device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing a multi-user experience on a mobile device, the system comprising:
   a processor;
   a memory;
   a communication interface in communication with an entity network and with the mobile device; and
   a multi-user management module stored in the memory, executable by the processor and configured for:
     receiving a security certificate from the mobile device;
     authenticating the security certificate;
     based on authenticating the security certificate, establishing network communication between the mobile device and a secured network segment;
     receiving a first request from the mobile device to receive first user-specific information for a first application executed by the mobile device from the secured network segment in communication with the entity network, wherein the first request comprises a device identifier and a user identifier associated with a first user;
     authenticating the user identifier associated with the first user;
     associating the user identifier associated with the first user with the device identifier;
     communicating a first response to the mobile device based on authenticating the user identifier associated with the first user, the first response including the first user-specific information;
     receiving a second request from the mobile device to receive second user-specific information associated with the first user for a second application executed by the mobile device from the secured network segment, wherein the second request comprises the device identifier;
     determining that the device identifier is associated with the user identifier associated with the first user;
     communicating a second response to the mobile device based on determining that the device identifier is associated with the user identifier associated with the first user, the second response including the second user-specific information;
     receiving a third request from the mobile device, wherein the third request comprises the device identifier and a second user identifier associated with a second user;
     disassociating the user identifier associated with the first user and the device identifier based on receiving the third request;
     associating the second user identifier with the device identifier based on receiving the third request;
     determining that a pre-defined time period has elapsed after receiving the third request;
     determining that the mobile device has not communicated a subsequent request before the pre-defined period has elapsed; and
     disassociating the second user identifier associated with the second user and the device identifier based on determining that the mobile device has not communicated a subsequent request before the pre-defined period has elapsed.

2. The system of claim 1, wherein the device identifier is the security certificate.

3. The system of claim 1, wherein the entity network further comprises a private network segment, and wherein the multi-user management module is further configured for blocking communications between the mobile device and the private network segment.

4. The system of claim 1, wherein the mobile device is a tablet computer.

5. The system of claim 1, wherein the multi-user management module is further configured for (i) receiving a fourth request, wherein the fourth request comprises a third user identifier, (ii) determining that the third user identifier is not authorized to make requests using the mobile device, (iii) blocking the fourth request based on determining that the third user identifier is not authorized to make requests using the mobile device.

6. The system of claim 5, wherein blocking the fourth request is further based on the device identifier.

7. A computer program product for providing a multi-user experience on a mobile device in communication with an entity network, the computer program product comprising a non-transitory computer-readable storage medium having computer-executable instructions for:
   receiving a security certificate from the mobile device;
   authenticating the security certificate;
   based on authenticating the security certificate, establishing network communication between the mobile device and a secured network segment;
   receiving a first request from the mobile device to receive first user-specific information for a first application executed by the mobile device from a secured network segment in communication with the entity network, wherein the first request comprises a device identifier and a user identifier associated with a first user;
   authenticating the user identifier associated with the first user;
   associating the user identifier associated with the first user with the device identifier;
   communicating a first response to the mobile device based on authenticating the user identifier associated with the first user;
   receiving a second request from the mobile device to receive second user-specific information associated with the first user for a second application executed by the mobile device from the secured network segment, wherein the second request comprises the device identifier;
   determining that the device identifier is associated with the user identifier associated with the first user;
   communicating a second response to the mobile device based on determining that the device identifier is associated with the user identifier associated with the first user;

receiving a third request from the mobile device, wherein the third request comprises the device identifier and a second user identifier associated with a second user;

disassociating the user identifier associated with the first user with the device identifier based on receiving the third request;

associating the second user identifier with the device identifier based on receiving the third request;

determining that a pre-defined time period has elapsed after receiving the third request;

determining that the mobile device has not communicated a subsequent request before the pre-defined period has elapsed; and disassociating the second user identifier associated with the second user and the device identifier based on determining that the mobile device has not communicated a subsequent request before the pre-defined period has elapsed.

8. The computer program product of claim 7, wherein the device identifier is the security certificate.

9. The computer program product of claim 7, wherein the entity network further comprises a private network segment, and wherein the non-transitory computer-readable storage medium further having computer-executable instructions for blocking communications between the mobile device and the private network segment.

10. The computer program product of claim 7, wherein the mobile device is a tablet computer.

11. The computer program product of claim 7, wherein the non-transitory computer-readable storage medium further having computer-executable instructions for (i) receiving a fourth request, wherein the fourth request comprises a third user identifier, (ii) determining that the third user identifier is not authorized to make requests using the mobile device, (iii) blocking the fourth request based on determining that the third user identifier is not authorized to make requests using the mobile device.

12. The computer program product of claim 11, wherein blocking the fourth request is further based on the device identifier.

13. A method for providing a multi-user experience on a mobile device via an entity network, the method comprising:

receiving a security certificate from the mobile device;

authenticating the security certificate;

based on authenticating the security certificate, establishing network communication between the mobile device and a secured network segment;

receiving, via a computer processor, a first request from the mobile device to receive first user-specific information for a first application executed by the mobile device from a secured network segment in communication with the entity network, wherein the first request comprises a device identifier and a user identifier associated with a first user;

authenticating, via a computer processor, the user identifier associated with the first user;

associating, via a computer processor, the user identifier associated with the first user with the device identifier;

communicating, via a computer processor, a first response to the mobile device based on authenticating the user identifier associated with the first user;

receiving, via a computer processor, a second request from the mobile device to receive second user-specific information associated with the first user for a second application executed by the mobile device from the secured network segment, wherein the second request comprises the device identifier;

determining, via a computer processor, that the device identifier is associated with the user identifier associated with the first user;

communicating, via a computer processor, a second response to the mobile device based on determining that the device identifier is associated with the user identifier associated with the first user;

receiving, via a computer processor, a third request from the mobile device, wherein the third request comprises the device identifier and a second user identifier associated with a second user;

disassociating, via a computer processor, the user identifier associated with the first user with the device identifier based on receiving the third request; and associating, via a computer processor, the second user identifier with the device identifier based on receiving the third request;

determining, via a computer processor, that a pre-defined time period has elapsed after receiving the third request;

determining, via a computer processor, that the mobile device has not communicated a subsequent request before the pre-defined period has elapsed; and disassociating, via a computer processor, the second user identifier associated with the second user and the device identifier based on determining that the mobile device has not communicated a subsequent request before the pre-defined period has elapsed.

14. The method of claim 13, wherein the device identifier is the security certificate.

15. The method of claim 13, wherein the entity network further comprises a private network segment, and wherein the method comprises blocking communications between the mobile device and the private network segment.

16. The method of claim 13, wherein the mobile device is a tablet computer.

17. The method of claim 13, further comprising (i) receiving, via a computer processor, a fourth request, wherein the fourth request comprises a third user identifier, (ii) determining, via a computer processor, that the third user identifier is not authorized to make requests using the mobile device, (iii) blocking, via a computer processor, the fourth request based on determining that the third user identifier is not authorized to make requests using the mobile device.

18. The method of claim 17, wherein blocking the fourth request is further based on the device identifier.

* * * * *